(12) United States Patent
Terada

(10) Patent No.: US 6,912,096 B2
(45) Date of Patent: Jun. 28, 2005

(54) REAR-FOCUS ZOOM LENS DEVICE AND VIDEO CAMERA

(75) Inventor: Hirotsugu Terada, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 10/882,700

(22) Filed: Jun. 29, 2004

(65) Prior Publication Data

US 2004/0263998 A1 Dec. 30, 2004

(30) Foreign Application Priority Data

Jun. 30, 2003 (JP) ................................ P2003-187429

(51) Int. Cl.⁷ .......................... G02B 15/14; G03B 17/00
(52) U.S. Cl. .................... 359/694; 359/696; 359/698; 359/702; 396/85; 396/79
(58) Field of Search ................................ 359/694, 696, 359/697, 698, 699, 701, 702, 703, 705, 823; 396/79, 85, 133

(56) References Cited

U.S. PATENT DOCUMENTS

| 4,255,020 | A | * | 3/1981 | Yukio .......................... 359/705 |
| 4,739,359 | A | * | 4/1988 | Fukahori et al. ............... 396/85 |
| 4,764,784 | A | * | 8/1988 | Torikoshi et al. ............. 396/79 |
| 5,016,993 | A | * | 5/1991 | Akitake ....................... 359/696 |
| 5,699,199 | A | * | 12/1997 | Cho et al. .................... 359/698 |
| 5,712,734 | A | * | 1/1998 | Kanno ......................... 359/701 |
| 5,982,566 | A | * | 11/1999 | Nishimura et al. .......... 359/822 |

\* cited by examiner

Primary Examiner—Loha Ben
(74) Attorney, Agent, or Firm—Frommer Lawrence & Haug LLP; William S. Frommer

(57) ABSTRACT

A rear-focus zoom lens device includes a wide-angle direction rotation restricting unit and a telephoto direction rotation restricting unit for separately restricting rotations of a zoom ring in a wide-angle direction and a telephoto direction and for separately canceling the restricting operations at any rotational positions of the zoom ring in the wide-angle direction and the telephoto direction, respectively, when rotating the zoom ring in the wide-angle direction and the telephoto direction, respectively.

14 Claims, 17 Drawing Sheets

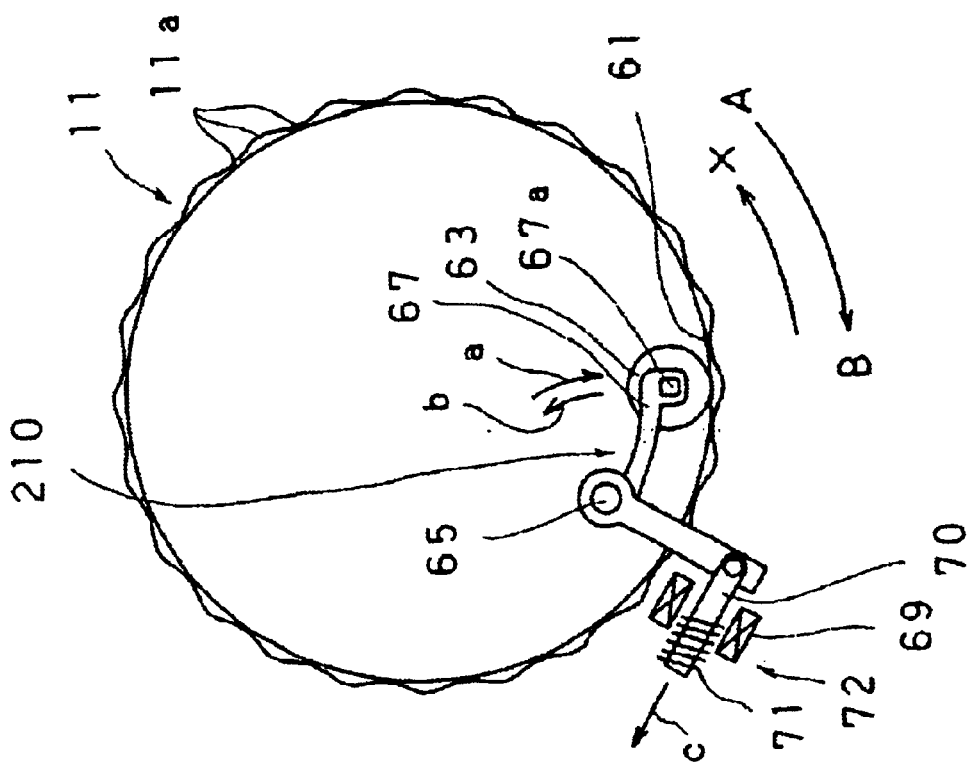
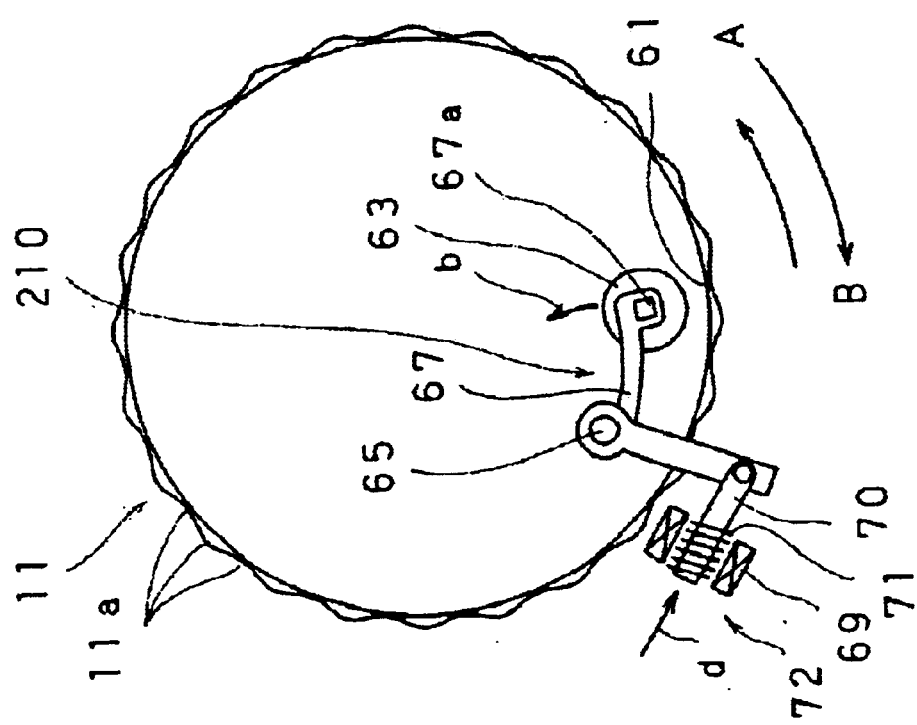

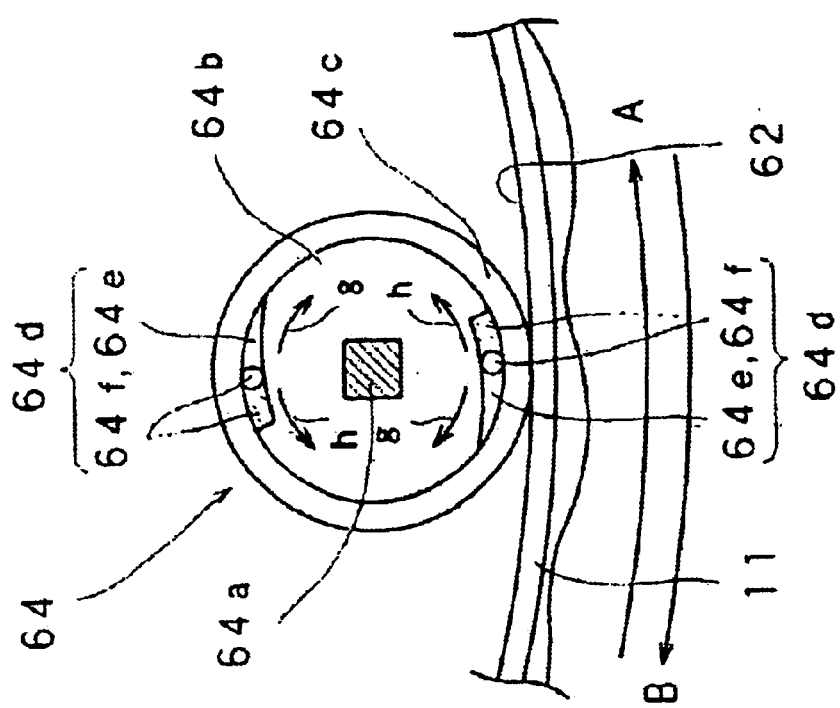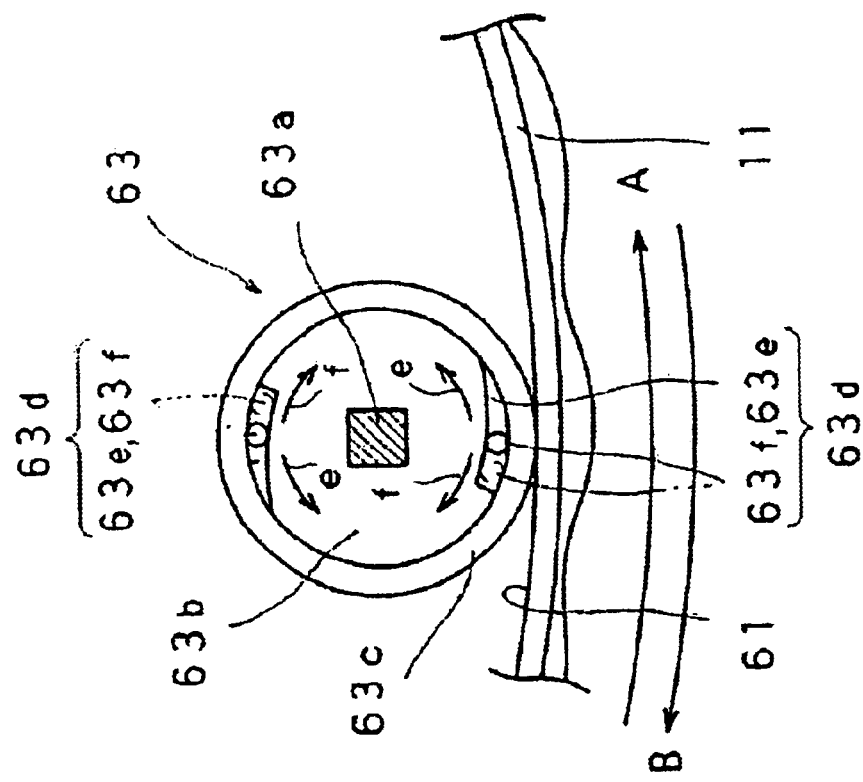

REAR-FOCUS ZOOM LENS DEVICE AND VIDEO CAMERA

BACKGROUND OF THE INVENTION

1. Field of the Invention

The present invention relates to the technical field of a rear-focus zoom lens device for carrying out zooming by a zooming lens, which is a combination lens, disposed at an end of a lens barrel, and for carrying out focusing by a focusing lens, which is a combination lens, disposed rearward of the zooming lens. The present invention also relates to the technical field of a video camera including the rear-focus zoom lens device.

2. Description of the Related Art

As is widely known, two types of zoom lens devices are used in, for example, video cameras. They are a front-focus zoom lens device and a rear-focus zoom lens device. In the front-focus zoom lens device, focusing is carried by a focusing lens, which is a combination lens, disposed at an end of a lens barrel, and zooming is carried out by a zooming lens, which is a combination lens, disposed rearward of the focusing lens. In the rear-focus zoom lens device, zooming is carried by a zooming lens, which is a combination lens, disposed at an end of a lens barrel, and focusing is carried out by a focusing lens, which is a combination lens, disposed rearward of the zooming lens.

In the front-focus zoom lens device which is the type of zoom lens device which is most often used in business video cameras, the position of a zoom ring, which is rotationally operated for zooming, in a rotational range is absolute, that is, is set within a predetermined angular range. Therefore, operation ends, that is, a zooming wide angle end and a zooming telephoto end, are definite, that is, the zoom ring is positionally restricted by a stopper. Consequently, the front-focus zoom lens device is excellent in, for example, adjusting the angle of view.

In recent years, even in business video cameras, there is a demand for easy operation and auto-focusing with progress in downsizing.

However, in a related front-focus zoom lens device used in a business video camera, focusing is carried out by a heavy, large diameter focusing lens disposed at an end of a lens barrel. Therefore, provision of an auto-focusing function for controlling the focusing lens by an electric operation results in problems, such as an increase in the size of an actuator and an increase in power consumption. Consequently, the front-focus zoom lens device is not necessarily a suitable zoom lens device.

In order to reduce costs, it is desirable to use a rear-focus zoom lens device which carries out focusing by a light, small-diameter focusing lens disposed at the rear end of a lens barrel.

In the rear-focus zoom lens device, however, when auto-focusing is utilized, the movements of the zooming lens and the focusing lens are controlled in the optical axis direction by an electronic cam in order to automatically carry out zooming and focusing, respectively, based on the relative positions of the lenses. Therefore, the positions of a zoom ring and a focus ring, which are rotationally operated, in rotational ranges are not absolute. Consequently, the positions are relative positions corrected by their positions relative to each other.

In other words, the zoom ring and the focus ring do not have absolute angular coordinates, as a result of which zooming and focusing are carried out based on relative coordinates based on how many angles the zoom ring and the focus ring are rotated and in which direction from their current positions. Therefore, the zoom ring and the focus ring rotate endlessly, and graduations for indicating the rotational positions of the zoom ring and the focus ring are not provided. Consequently, the operation ends of the zoom ring and the focus ring cannot be determined.

In a business video camera which requires a complicated image representation by, for example, repeating zooming within the same range by the rear-focus zoom lens device having this disadvantage, the fact that the zooming position is a relative position which changes each time focusing is carried out is a critical disadvantage. This is one of the major reasons why the rear-focus zoom lens device is not conventionally accepted for use in video cameras.

To overcome the aforementioned problems, a rear-focus zoom lens device which comprises a clutch mechanism for switching between manual function and auto function in order to determine the operation ends is provided (refer to, for example, Japanese Unexamined Patent Application Publication No. 2003-5015). Many patent applications regarding such a clutch mechanism have been filed. There is also a zoom lens device having a mechanical zoom ring. In this type of zoom lens device, when the zoom ring reaches either a focus or a zoom optical end, the rotation of the operated ring is stopped by rotationally driving a stopper by a motor and engaging it with one of the teeth of a gear of the zoom ring in order to allow an operator to confirm by touch that the zoom ring has reached either the focus or zoom optical end (refer to, for example, Japanese Unexamined Patent Application Publication No. 8-313793).

In the related clutch mechanism, however, when the zoom function is set to the manual mode once, if it becomes necessary to carry out flange back adjustment or angle-of-view correction by zooming due to thermal expansion/contraction of the entire lens barrel or due to an auto-focusing function, electrical correction cannot be carried out. In the rear-focus zoom lens device, since the control of the rotation of the zoom ring is electrically carried out, the operation of the zoom lens device is lightened compared to a front-focus zoom lens device having a mechanical zoom ring. Therefore, when an operator tries to carry out focusing, he/she may touch the zoom ring, or the zoom ring may move by, for example, slight vibration when it is installed in a vehicle. When focusing is carried out while the angle of view is deliberately fixed, such as in time-lapse shooting or animation shooting, the operator may accidentally touch the zoom ring and unconsciously change the angle of view, as a result of which an image cannot be used. Even if a related zoom lens device can store the position, it does not have a mechanism for fixing the position.

SUMMARY OF THE INVENTION

Accordingly, it is an object of the present invention to provide a rear-focus zoom lens device which can provide the same operability as a front-focus zoom lens device which is often used in business video cameras without using a clutch mechanism, and a video camera including the rear-focus zoom lens device.

To this end, according to one aspect of the present invention, there is provided a rear-focus zoom lens device comprising two rotation restricting means for separately restricting rotations of a zoom ring in first and second rotation directions with respect to a lens barrel and for separately canceling the restricting operations, the second rotation direction being opposite to the first rotation direction.

According to another aspect of the present invention, there is provided a video camera comprising a rear-focus zoom lens device comprising two rotation restricting means for separately restricting rotations of a zoom ring in first and second rotation directions with respect to a lens barrel and for separately canceling the restricting operations, the second rotation direction being opposite to the first rotation direction.

In the rear-focus zoom lens device and the video camera of the present invention having the above-described structure, when the zoom ring is rotated with respect to the lens barrel in two directions, that is, the first rotation direction and the second rotation direction opposite to the first rotation direction, the two rotation restricting means separately restrict the rotations of the zoom ring in the first rotation direction and the second rotation direction and separately cancel the restricting operations at any rotational positions of the zoom ring in the two directions. Therefore, even if the zoom lens device is a rear focus type, it makes it possible to know a zoom operation end like a front-focus zoom lens device.

In the rear-focus zoom lens device and the video camera of the present invention, as mentioned above, when the zoom ring is rotated in two directions, that is, the first rotation direction and the second rotation direction opposite to the first rotation direction, with respect to the lens barrel, the two rotation restricting means can separately restrict the rotations of the zoom ring in the first and second rotation directions and separately cancel the restricting operations at any rotational positions in the two rotation directions of the zoom ring. Accordingly, although the zoom lens device is a rear focus type, it makes it possible for a shooter to know a zoom operation end like a front-focus zoom lens device. Therefore, the rear-focus zoom lens device provides the following advantages of a front-focus zoom lens device, often used in business video cameras, which cannot be provided by related rear-focus zoom lens devices, without using a clutch mechanism. That is, the rear-focus zoom lens device makes it possible to clearly confirm operation ends, such as the wide-angle end and the telephoto-end, during zooming, and to enhance operability.

Like a front-focus zoom lens device, the rear-focus zoom lens device and the video camera of the present invention make it possible to know zoom operation ends. Therefore, various auto functions and correction functions (such as auto-focusing and auto flange back adjustment) can be provided without forcing a shooter to manually switch between a zoom function and a servo function as with a clutch mechanism.

In the rear-focus zoom lens device and the video camera of the present invention, as mentioned above, the two rotation restricting means can separately restrict the rotations of the zoom ring in the first and second rotation directions and separately cancel the restricting operations at any rotational positions in the first and second rotation directions of the zoom ring. Therefore, when a shooter wants to deliberately fix the zoom position (angle of view) in, for example, animation shooting or time lapse shooting, the shooter can freely fix the zoom position (angle of view) at any position. Consequently, the shooter can perform, for example, a desired time-lapse shooting or a desired animation shooting.

In the rear-focus zoom lens device and the video camera of the present invention, since the two rotation restricting means restrict the rotational positions of the zoom ring which is independent of a zooming lens and a focusing lens, the rotation restricting means do not adversely affect the correction of the angle of view by focusing or the movement of the zoom position that is required due to thermal expansion/contraction of the entire lens barrel.

In the rear-focus zoom lens device and the video camera of the present invention, since the two rotation restricting means restrict the rotational positions of the zoom ring which is independent of the zooming lens and the focusing lens, the load on the motors for moving, for example, the zooming lens and the focusing lens is reduced, and size reduction of the entire zoom lens device, electric power saving, low noise, etc., can be achieved.

In the rear-focus zoom lens device and the video camera of the present invention, the two rotation restricting means can restrict the rotational positions of the zoom ring in a stepless manner. Therefore, when a shooter wants to deliberately fix the zoom position (angle of view) in, for example, animation shooting or time-lapse shooting, the shooter can minutely set any zoom position (angle of view), so that operability is enhanced.

BRIEF DESCRIPTION OF THE DRAWINGS

FIGS. 15A and 15B are side views for illustrating the operations of the wide-angle direction stepless rotation restricting means;

FIGS. 17A and 17B are side views of one-way clutches of unidirectional rotary pressure rollers in the wide-angle direction stepless rotation restricting means and the telephoto direction stepless rotation restricting means.

DESCRIPTION OF THE PREFERRED EMBODIMENTS

Hereunder, embodiments of a rear-focus zoom lens device and a video camera to which the present invention is applied will be described. A first embodiment (FIGS. 1 to 8), a second embodiment (FIGS. 9 to 11), and a third embodiment (FIGS. 12 to 17) will be described in that order.

(1) First Embodiment

First, the rear-focus zoom lens device and the video camera of the first embodiment will be described with reference to FIGS. 1 to 8. The rear-focus zoom lens device has an auto-focus function.

Figure 8:
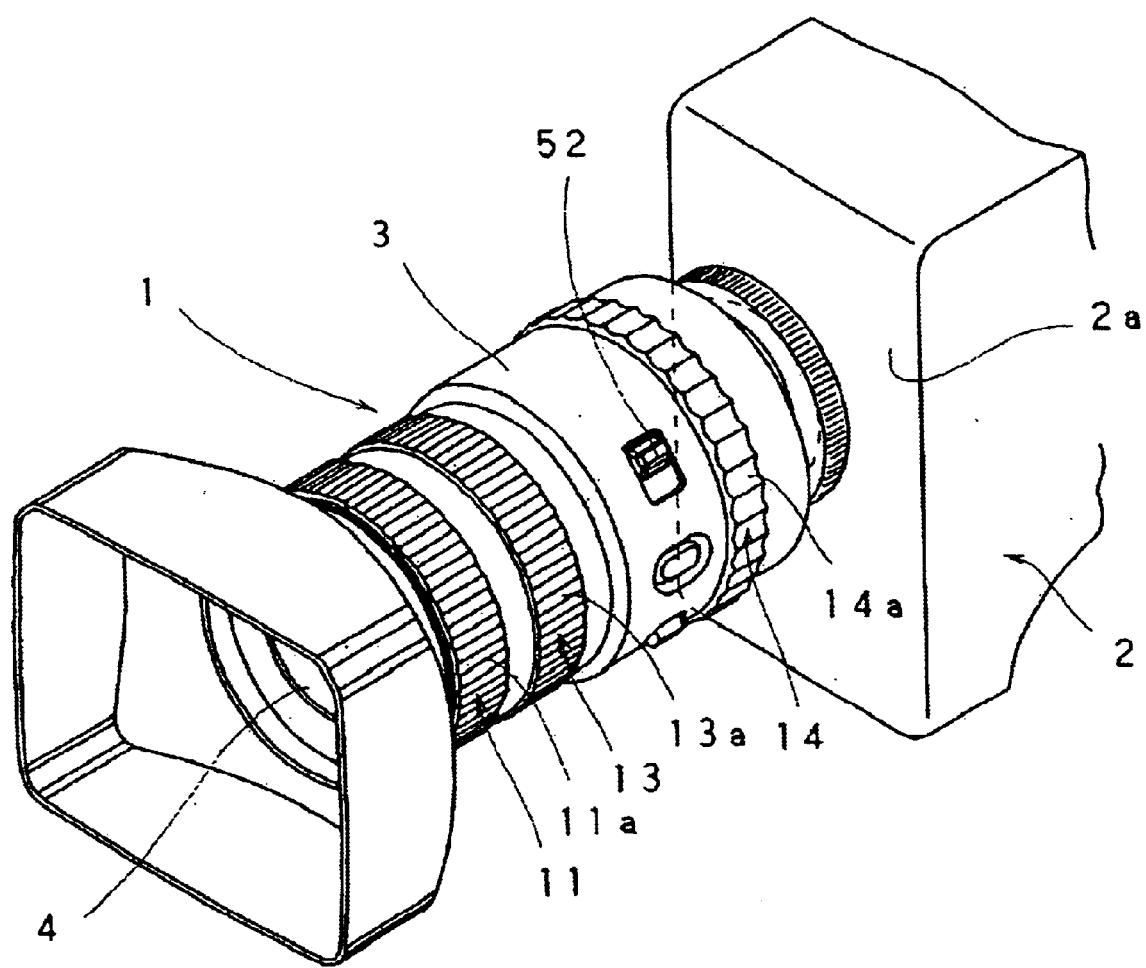
FIG. 8 is a perspective view of an end portion of the video camera to which the zoom lens device is mounted.

FIG. 8 shows a rear-focus zoom lens device (hereinafter simply referred to as "the zoom lens device") 1 and an end portion 2a of a video camera 2 having the zoom lens device 1 removably mounted thereto.

Figure 6:
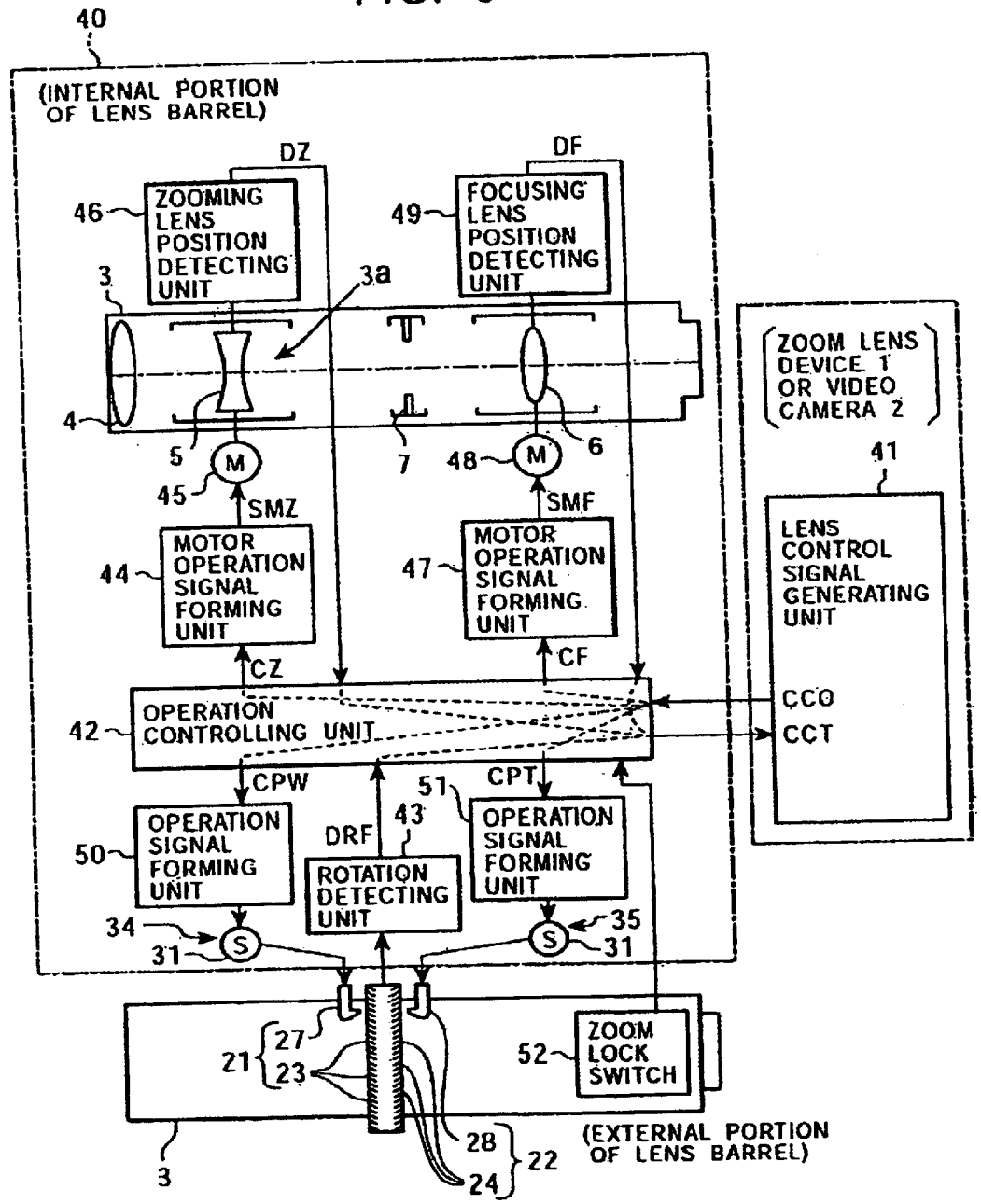
FIG. 6 is a block diagram of an optical controlling system incorporating a controlling device for the wide-angle direction rotation restricting means and the telephoto direction rotation restricting means and a controlling device for the zoom lens device.

As shown in FIGS. 6 and 8, the zoom lens device 1 has a large-diameter end lens 4 secured at an end on an optical axis 3a in a lens barrel 3. A zooming lens 5 and a focusing lens 6, each of which is a combination lens, are disposed apart from each other in the forward-and-backward direction on the optical axis 3a and behind the end lens 4 in the lens barrel 3. An iris 7 is incorporated between the zooming lens 5 and the focusing lens 6 at the optical axis 3a. The zooming lens 5, the focusing lens 6, and the iris 7 are constructed so that their forward and backward movements along the optical axis 3a in the lens barrel 3 can be adjusted.

A zoom ring 11, a focusing ring 14, and an iris ring 13 for adjusting the forward and backward movements of the zooming lens 5, focusing lens 6, and the iris 7, respectively, along the optical axis 3a are mounted to the respective outer peripheral positions of the zooming lens 5, focusing lens 6, and iris 7 at the outer periphery of the lens barrel 3 so as to be rotatable around the optical axis 3a. Outer peripheral surfaces 11a, 14a, and 13a of the respective zoom ring 11, focus ring 14, and iris ring 13 have, for example, rough surfaces or knurls for manual operation.

As shown in FIGS. 1 to 5, two rotation restricting means, that is, wide-angle direction rotation restricting means 21 and telephoto direction rotation restricting means 22, are mounted to the zoom lens device 1. The rotation restricting means restrict the rotations of the zoom ring 11 in a wide-angle direction A and a telephoto direction B and cancel the restricting operations at any rotational positions in these two directions. The wide-angle direction A is a first rotation direction of the zoom ring 11 and the telephoto direction B is a second rotation direction opposite to the first rotation direction.

The wide-angle direction rotation restricting means 21 and the telephoto direction rotation restricting means 22 are directly mounted to the zoom ring 11 or to a rotary ring 110 (see FIGS. 9 to 11) which is rotated in response to the movement of the zoom ring 11.

The wide-angle direction rotation restricting means 21 comprises, for example, a ratchet mechanism 29 and an actuator 34. The telephoto direction rotation restricting means 22 comprises, for example, a ratchet mechanism 30 and an actuator 35. The ratchet mechanism 29 comprises a ratchet pawl 23 and a ratchet pawl arm 27. The ratchet mechanism 30 comprises a ratchet pawl 24 and a ratchet pawl arm 28. The ratchet pawls 23 and 24 are disposed in an annular form along the entire inner periphery at respective ends of the zoom ring 11 in an axial direction. The ratchet pawl arms 27 and 28 are disposed at the respective ends of the zoom ring 11 by being pivotally supported by respective support pins 25 and 26 at the lens barrel 3, engage and disengage the respective ratchet pawls 23 and 24 from the inner sides thereof in the direction of arrows a and in the direction of arrows b, respectively, and have respective ratchet pawls 27a and 28a at the ends thereof. The actuators 34 and 35 are mounted to the lens barrel 3, and comprise respective plunger solenoids 31, respective plungers 32, and respective return springs 33 for swingably driving the respective ratchet pawl arms 27 and 28 in the directions of arrows c and d.

The ratchet pawls 23 and 24 and the ratchet pawls 27a and 28a of the respective ratchet pawl arms 27 and 28 of the ratchet mechanisms 29 and 30 of the respective wide-angle direction rotation restricting means 21 and telephoto direction rotation restricting means 22 are inclined in opposite directions.

Accordingly, the wide-angle direction rotation restricting means 21 is formed as unidirectional rotation restricting means for allowing rotation of the zoom ring 11 in the telephoto direction B while restricting the rotation of the zoom ring 11 in the wide-angle direction A. Similarly, the telephoto direction rotation restricting means 22 is formed as unidirectional rotation restricting means for allowing rotation of the zoom ring 11 in the wide-angle direction A while restricting the rotation of the zoom ring 11 in the telephoto direction B.

Here, with reference to FIGS. 4 and 5, the operations of the wide-angle direction rotation restricting means 21 and the telephoto direction rotation restricting means 22 for restricting the rotation of the zoom ring 11 in the wide-angle direction A and the telephoto direction B, respectively, will be described.

Figure 1:
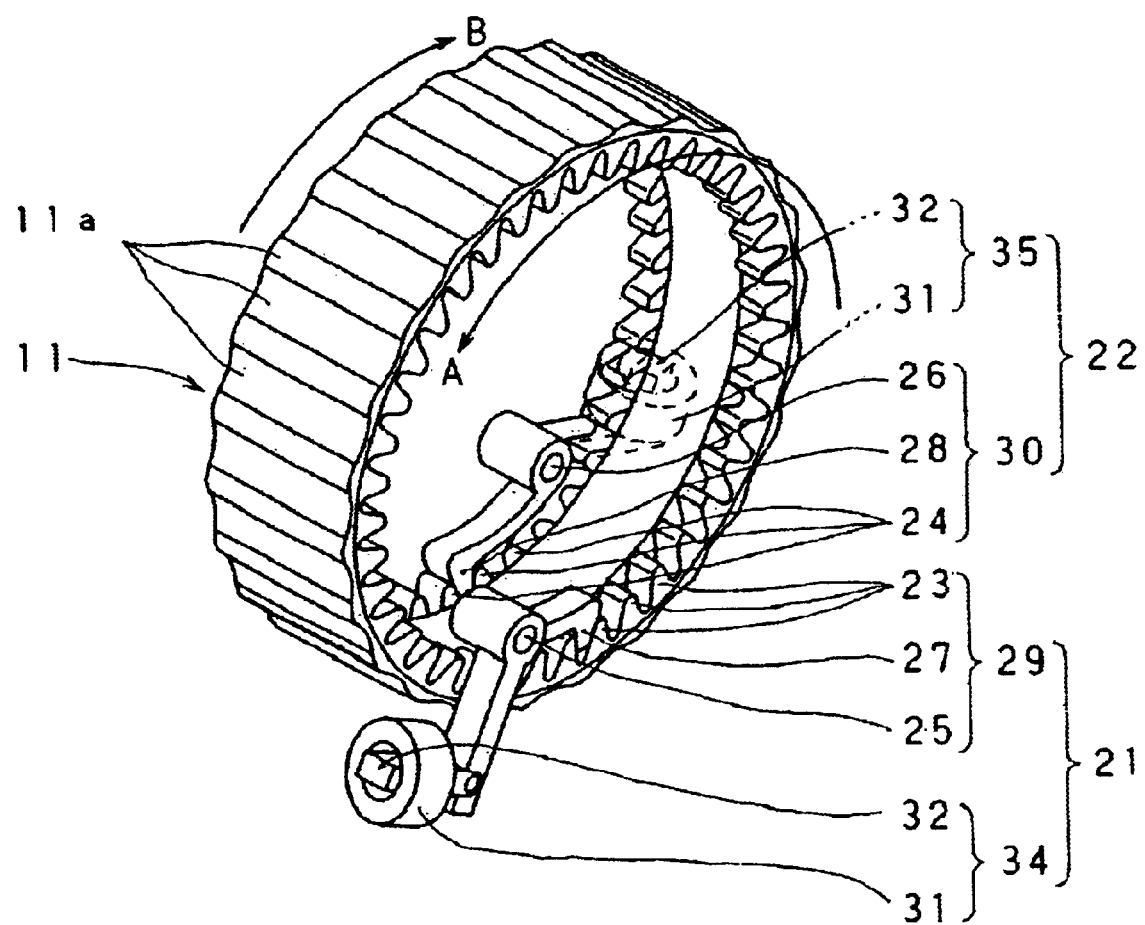
FIG. 1 is a perspective view of wide-angle direction rotation restricting means and telephoto direction rotation restricting means for a zoom ring in a first embodiment of a rear-focus zoom lens device and a video camera to which the present invention is applied.
Figure 2:
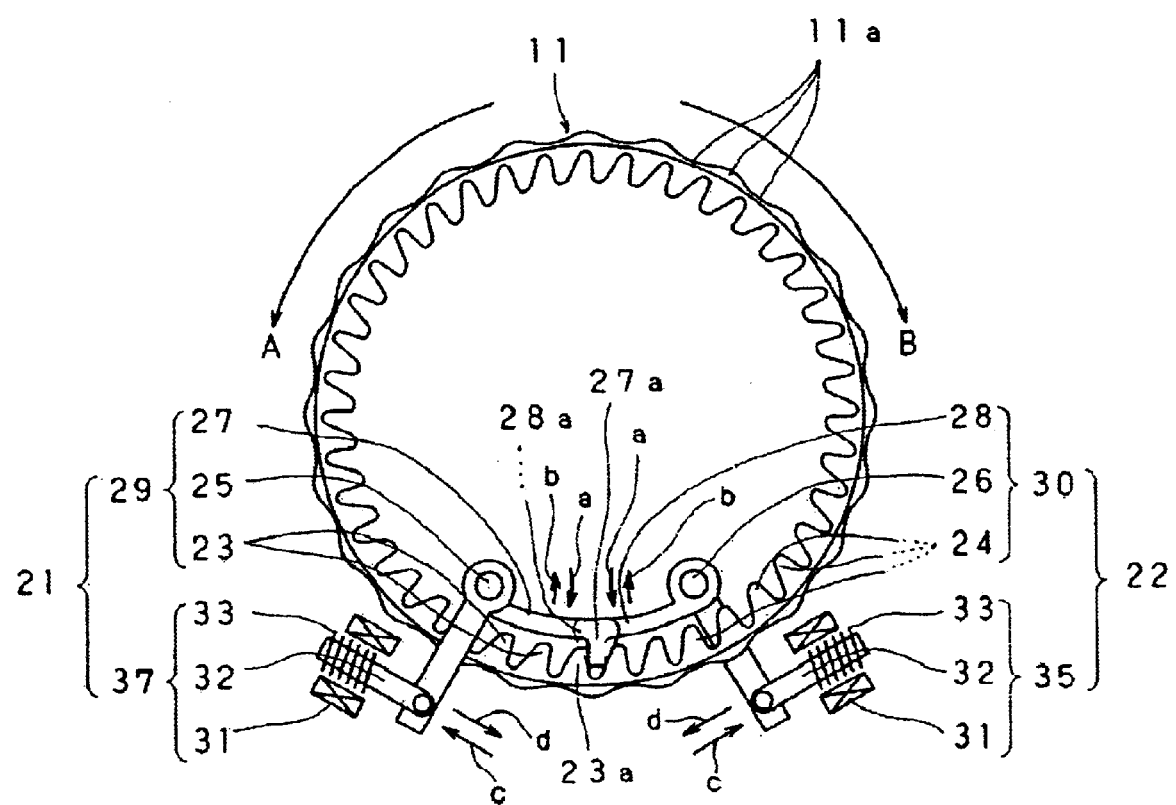
FIG. 2 is a side view of FIG. 1.
Figure 3:
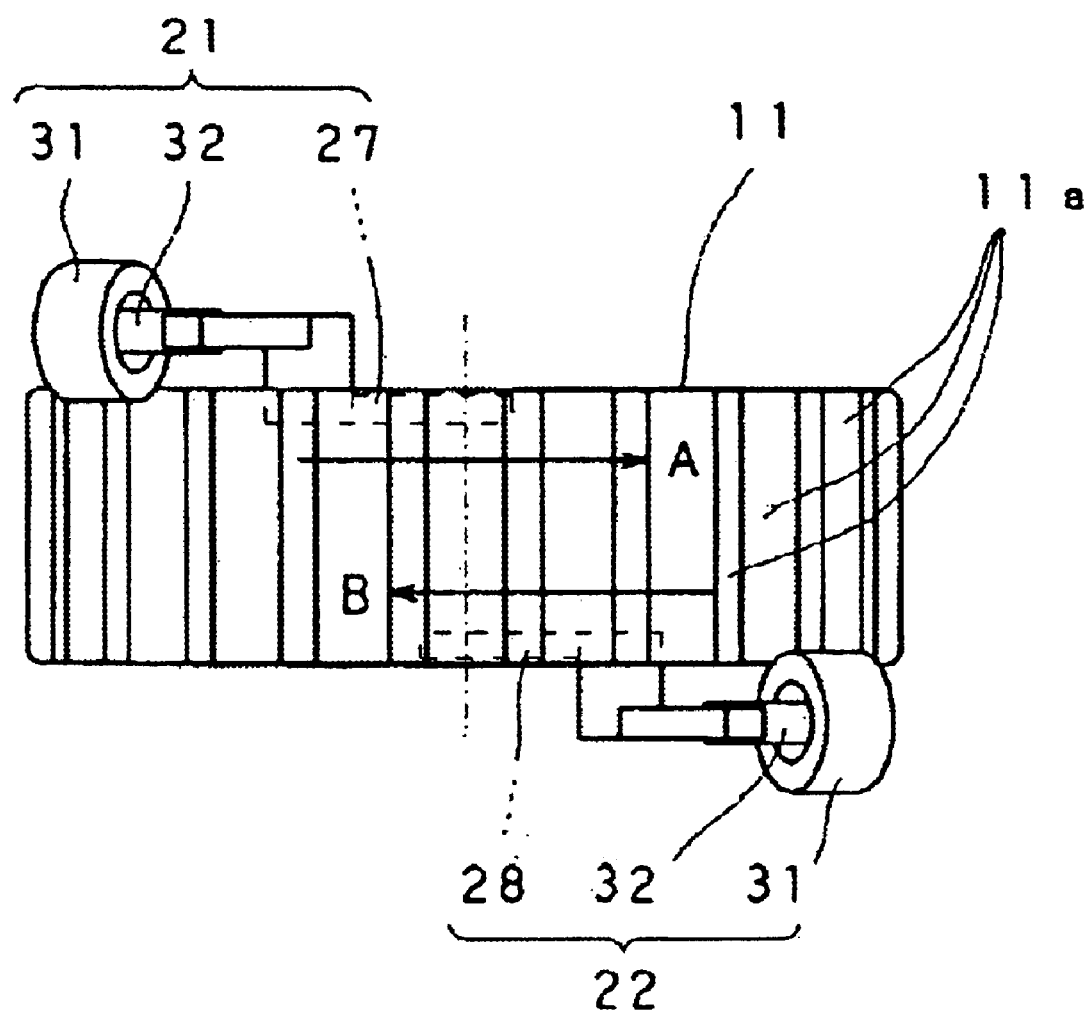
FIG. 3 is a bottom view of FIG. 2.
Figure 4A:
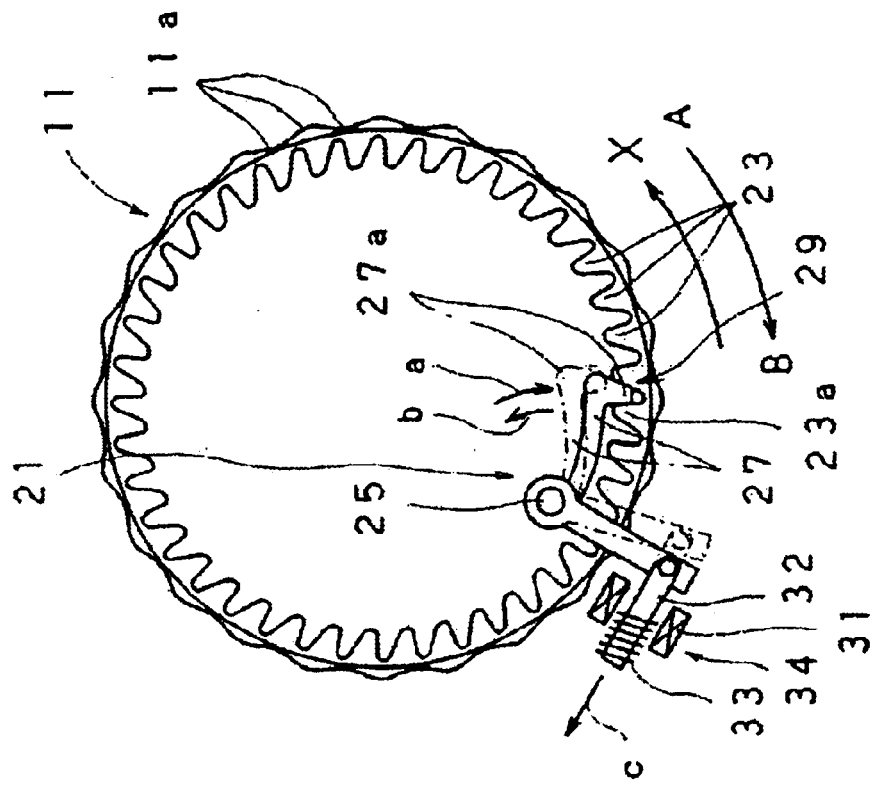
FIGS. 4A and 4B are side views for illustrating the operations of the wide-angle direction rotation restricting means.
Figure 5A:
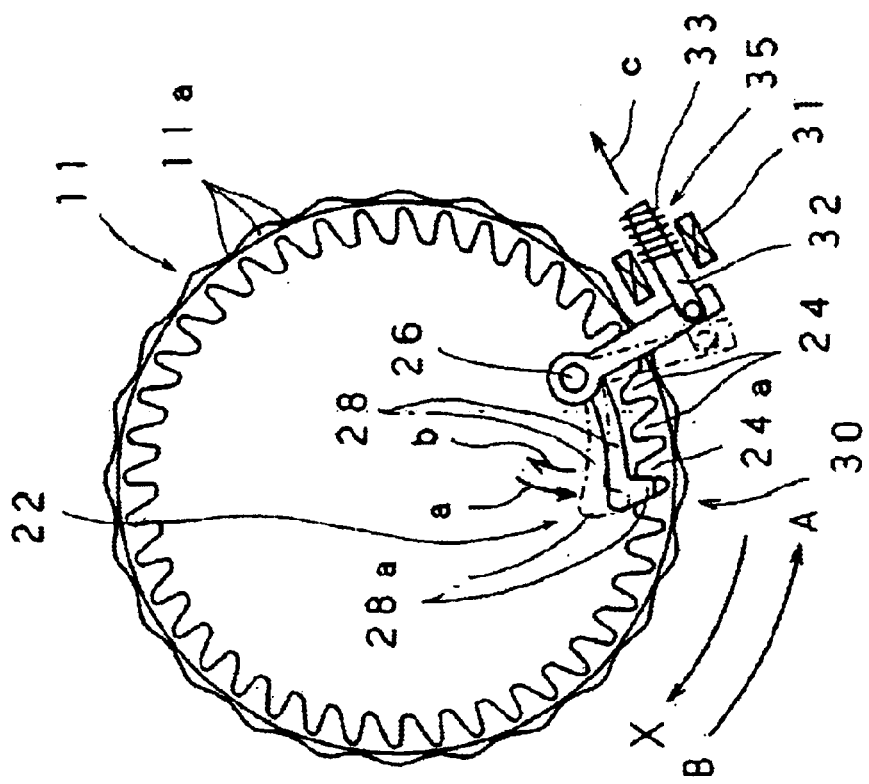
FIGS. 5A and 5B are side views for illustrating the operations of the telephoto direction rotation restricting means.

As shown in FIGS. 4A and 5A, when the plunger solenoids 31 of the actuators 34 and 35 of the respective wide-angle direction rotation restricting means 21 and the telephoto direction rotation restricting means 22 are in a non-excitation state (off), the plungers 32 are returned in the direction of arrows d by the respective return springs 33, causing the ratchet pawl arms 27 and 28 of the respective ratchet mechanisms 29 and 30 to rotate in the direction of arrows b around the respective support pins 25 and 26, so that the ratchet pawls 27a and 28a at the ends of the ratchet pawl arms 27 and 28 disengage the respective ratchet pawls 23 and 24 of the zoom ring 11.

Therefore, when the actuators 34 and 35 having the plunger solenoids 31 in a non-excitation state are off, the functions for restricting the rotations of the zoom ring 11 by the wide-angle direction rotation restricting means 21 and the telephoto direction rotation restricting means 22 are off, so that a shooter can carry out zooming operations by manually and freely adjusting the rotations in the wide-angle direction A and the telephoto direction B.

Next, as shown in FIG. 4A, when the plunger solenoid 31 of the actuator 34 of the wide-angle direction rotation restricting means 21 is excited (on) by a wide-angle end position signal CPW (described later) by an optical controlling system 40 shown in FIG. 6 while the rotation of the zoom ring 11 is being manually adjusted in the wide-angle direction A, as shown by a solid line in FIG. 4B, the plunger 32 is attracted in the direction of arrow c against the return spring 33. This causes the ratchet pawl arm 27 of the ratchet mechanism 29 to be rotationally driven around the support pin 25 as a center in the direction of arrow a by the force of the return spring 33, so that the ratchet pawl 27a at the end of the ratchet pawl arm 27 engages one pawl portion 23a of the ratchet pawl 23. At the moment that the ratchet pawl 27a engages one pawl portion 23a, the ratchet pawl arm 27 restricts the rotation of the zoom ring 11 in the wide-angle direction A (that is, makes the zoom ring 11 incapable of rotating).

Here, although the ratchet pawl arm 27 engaging the ratchet pawl 23 restricts the rotation of the zoom ring 11 in the wide-angle direction A, it allows rotation in the telephoto direction B.

Figure 4B:
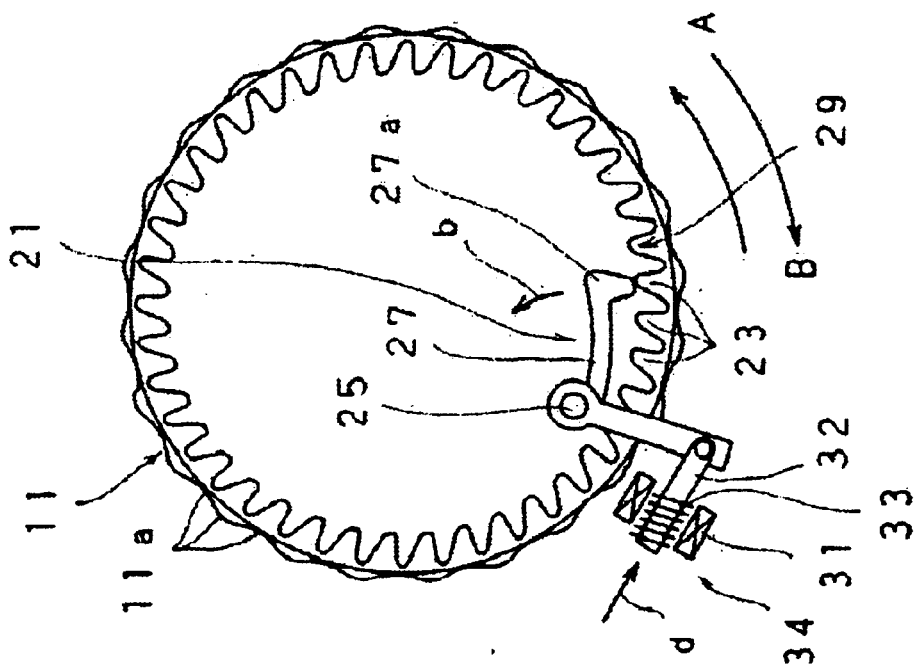

In other words, when the zoom ring 11 is manually rotated in the telephoto direction B while the ratchet pawl arm 27 engages the ratchet pawl 23 as indicated by the solid line in FIG. 4B, a cam action caused by the inclined surface of the ratchet pawl 23 and the inclined surface of the ratchet pawl 27a causes the ratchet pawl arm 27 to rotate around the support pin 25 as a center in the direction of arrow b against the return spring 33, so that the ratchet pawl 27a disengages the ratchet pawl 23, as shown by an alternate long and short dash line in FIG. 4B. Therefore, while the ratchet pawl arm 27 of the ratchet mechanism 29 successively moves over portions of the ratchet pawl 23 relatively in the telephoto direction B, the rotation of the zoom ring 11 in the telephoto direction B can be manually adjusted (that is, a zooming operation can be carried out).

As shown in FIG. 5A, when the plunger solenoid 31 of the actuator 35 of the telephoto direction rotation restricting means 22 is excited (on) by a telephoto end position signal CPT (described later) by the optical controlling system 40 shown in FIG. 6 while the rotation of the zoom ring 11 is being manually adjusted in the telephoto direction B, the plunger 32 is attracted in the direction of arrow c against the return spring 33 as shown by a solid line in FIG. 5B. This causes the ratchet pawl arm 28 of the ratchet mechanism 30 to be rotationally driven around the support pin 26 as a center in the direction of arrow a, as a result of which the ratchet pawl 28a at the end of the ratchet pawl arm 28 engages one pawl portion 24a of the ratchet pawl 24. At the moment that the ratchet pawl 28a engages one pawl portion 24a, the ratchet pawl arm 28 restricts the rotation of the zoom ring 11 in the telephoto direction B (that is, makes the zoom ring 11 incapable of rotating).

Here, although the ratchet pawl arm 28 engaging the ratchet pawl 24 restricts the rotation of the zoom ring 11 in the telephoto direction B, it allows rotation in the wide angle direction A.

Figure 5B:
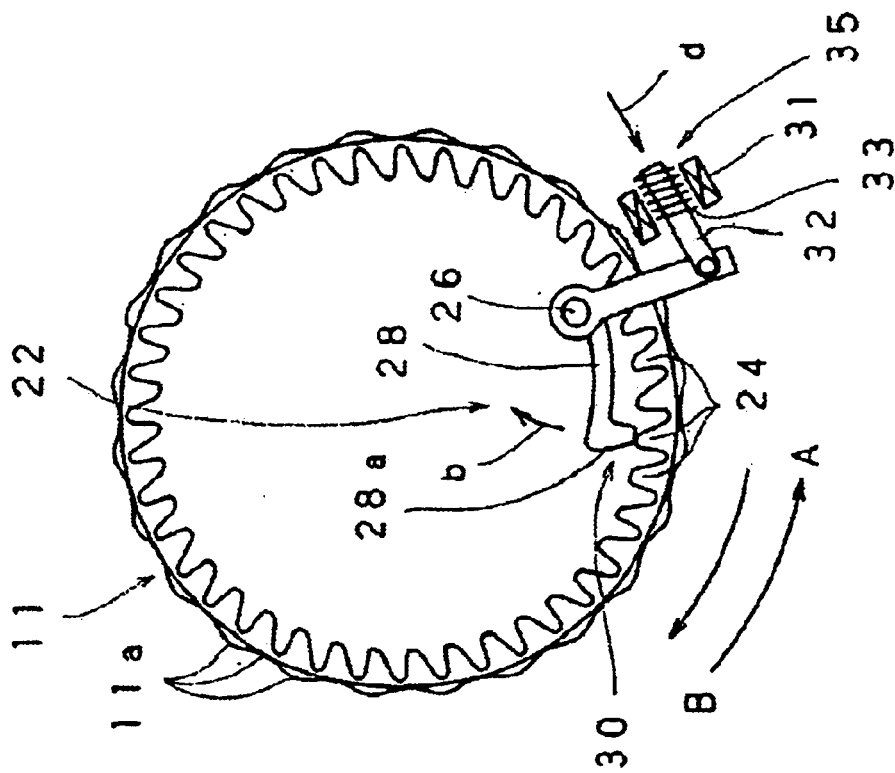

In other words, when the zoom ring 11 is manually rotated in the wide angle direction A while the ratchet pawl arm 28 engages the ratchet pawl 24 as shown by the solid line in FIG. 5B, a cam action caused by the inclined surface of the ratchet pawl 24 and the inclined surface of the ratchet pawl 28a causes the ratchet pawl arm 28 to rotate around the support pin 26 as a center in the direction of arrow b against the return spring 33, so that the ratchet pawl arm 28 disengages the ratchet pawl 24 as shown by an alternate long and short dash line in FIG. 5B. Therefore, while the ratchet pawl arm 28 of the ratchet mechanism 30 successively moves over portions of the ratchet pawl 24 relatively in the wide angle direction A, the rotation of the zoom ring 11 in the wide angle direction A can be manually adjusted (that is, a zooming operation can be carried out).

Next, the controlling operation of the optical controlling system 40 shown in FIG. 6 on the zoom lens device 1 will be described.

A lens control signal generating unit 41 comprising a microcomputer is incorporated in the zoom lens device 1 or the video camera 2, and supplies external control signals CCO, such as a zooming adjustment control signal, a focusing adjustment control signal, and an iris adjustment control signal, to an operation controlling unit 42 by a microcomputer of the zoom lens device 1.

Here, when the shooter manually rotates the zoom ring 11 in either the wide angle direction A or the telephoto direction B, a rotation detecting unit 43 comprising, for example, a rotary encoder supplies a rotation detection output signal DRF to the operation controlling unit 42. The rotation detection output signal DRF is supplied as an external sending signal CCT to the lens control signal generating unit 41 from the operation controlling unit 42.

This causes the lens control signal generating unit 41 to supply the zooming adjustment control signal, which is an external control signal CCO, to the operation controlling unit 42, and, then, the operation controlling unit 42 to supply a zooming control signal CZ to a motor operation signal forming unit 44. In accordance with a motor operation signal SMZ supplied to a zooming motor 45, such as a pulse motor, from the motor operation signal forming unit 44, the zooming motor 45 is rotationally controlled to a predetermined angle in either the wide angle direction or the telephoto direction, so that the zooming lens 5 automatically carries out a zooming operation in either the wide angle direction or the telephoto direction.

A zooming lens position detecting unit 46 detects the position of the zooming lens 5, and, then, supplies a detection output signal DZ to the operation control unit 42. The operation control unit 42 feedbacks the detection output signal DZ as an external sending signal CCT to the lens control signal generating unit 41.

In synchronism with the zooming in either the wide angle direction or the telephoto direction, the lens control signal generating unit 41 supplies a focus control signal CF as an external control signal CCO to the operation control unit 42, and, then, the operation control unit 42 supplies the focus control signal CF to a motor operation signal forming unit 47. In accordance with a motor operation signal SMF supplied to a focusing motor 48, such as a pulse motor, from the motor operation signal forming unit 47, the focusing motor 48 is rotationally controlled to a predetermined angle, so that auto-focusing is carried out by the focusing lens 6.

Then, a focusing lens position detecting unit 49 detects the position of the focusing lens 6, and supplies a detection output signal DF to the operation controlling unit 42. The operation controlling unit 42 feedbacks the detection output signal DF as an external sending signal CCT to the lens control signal generating unit 41.

Figure 7:
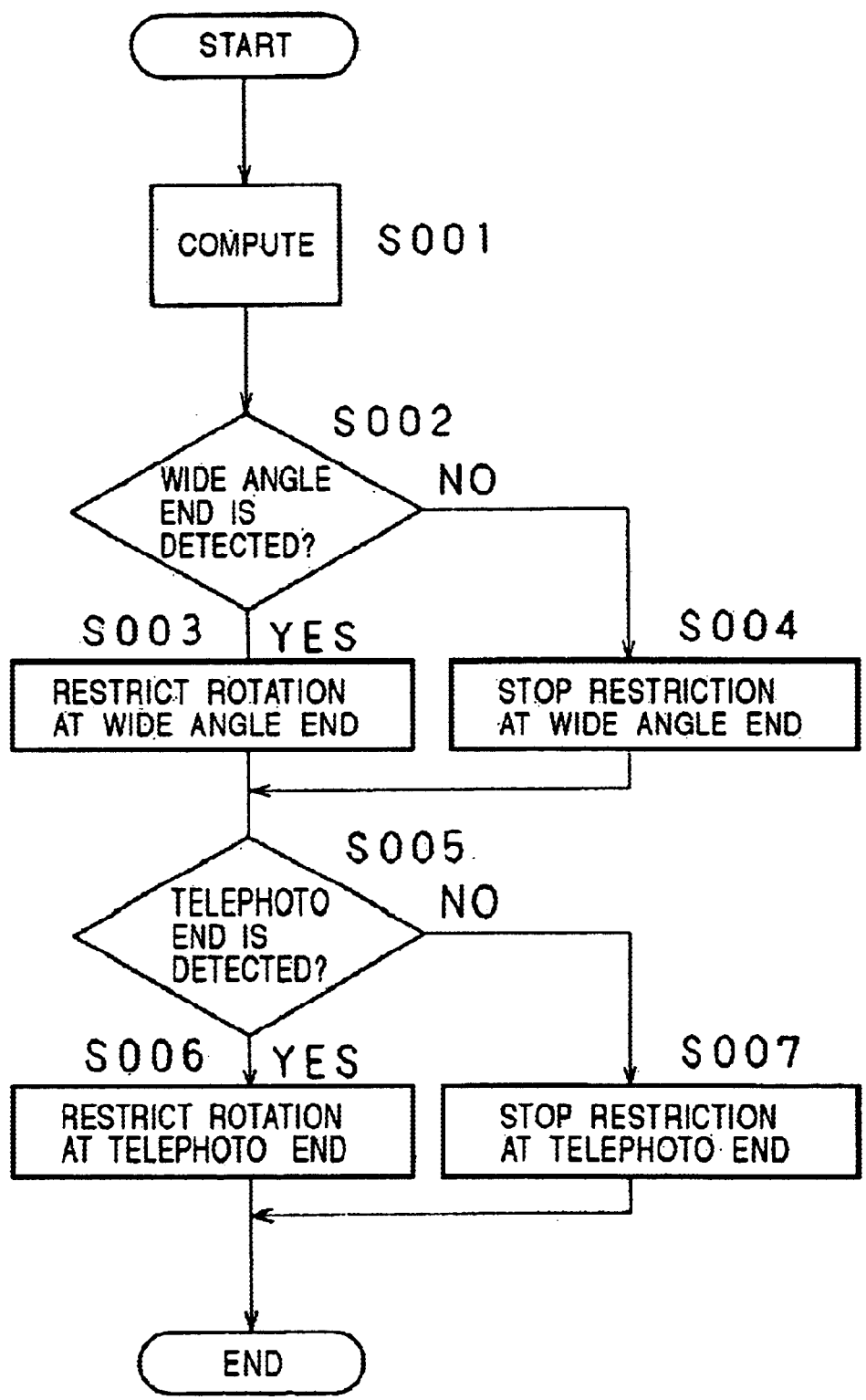
FIG. 7 is a flow chart illustrating the detection of a wide-angle end and a telephoto end of the zoom ring and the restriction of the position of the zoom ring by the wide-angle direction rotation restricting means and the telephoto direction rotation restricting means in the optical controlling system shown in FIG. 6.

Here, the rotation restriction and rotation restriction canceling operations on the zoom ring 11 will be described based on the optical controlling system 40 shown in FIG. 6 with reference to the flowchart shown in FIG. 7. The operations are carried out by the wide-angle direction rotation restricting means 21 and the telephoto direction rotation restricting means 22 at operation ends, that is, a wide-angle end W and a telephoto end T, while the rotation of the zoom ring 11 is being manually adjusted in the wide-angle direction A and the telephoto direction B, respectively (that is, when zooming is being carried out).

When the rotation of the zoom ring 11 is stopped at a mechanical stopping position based on the zooming lens 5 and/or the focusing lens 6 while the rotation of the zoom ring 11 is being manually adjusted in either the wide-angle direction A or the telephoto direction B, the lens control signal generating unit 41 calculates the detection output signals DZ and DF output thereto from the respective zooming lens position detecting unit 46 and the focusing lens position detecting unit 49 through the operation controlling unit 42 in Step S001, and determines whether or not the stopping position of the zoom ring 11 at this time is the wide-angle end W in Step S002.

If the lens control signal generating unit 41 determines that the stopping position of the zoom ring 11 is the wide-angle end W, the lens control signal generating unit 41 supplies a wide-angle end restriction command signal to a wide-angle end operation signal forming unit 50 through the operation controlling unit 42.

This causes the wide-angle end operation signal forming unit 50 to excite the plunger solenoid 31 of the actuator 34 of the wide-angle direction rotation restricting means 21, causing the ratchet pawl arm 27 of the ratchet mechanism 29 to engage one pawl portion 23a of the ratchet pawl 23 of the zoom ring 11 as indicated by the solid line shown in FIG. 4B. As a result, the restriction of the rotation of the zoom ring 11 in the wide-angle direction A is executed in Step S003.

If the lens control signal generating unit 41 determines that the stopping position is not the wide-angle end W, the lens control signal generating unit 41 supplies a wide-angle end restriction canceling signal to the wide-angle end operation signal forming unit 50 through the operation controlling unit 42. The wide-angle end operation signal forming unit 50 stops the excitation of the plunger solenoid 31 of the actuator 34 of the wide-angle direction rotation restricting means 21, causing the ratchet pawl arm 27 of the ratchet mechanism 29 to disengage the ratchet pawl 23 at the zoom ring 11. As a result, the restriction of the rotation of the zoom ring 11 in the wide-angle direction A is canceled in Step S004.

Next, the lens control signal generating unit 41 determines whether or not the stopping position of the zoom ring 11 at this time is the telephoto end T.

If the lens control signal generating unit 41 determines that the stopping position of the zoom ring 11 at this time is the telephoto end T in Step S005, the lens control signal generating unit 41 supplies a telephoto end restriction command signal to a telephoto-end operation signal forming unit 51 through the operation controlling unit 42.

This causes the telephoto end operation signal forming unit 51 to excite the plunger solenoid 31 of the actuator 35 of the telephoto direction rotation restricting means 22, causing the ratchet pawl arm 28 of the ratchet mechanism 30 to engage one pawl portion 24a of the ratchet pawl 24 at the zoom ring 11 as indicated by the solid line shown in FIG. 5B. As a result, the restriction of the rotation of the zoom ring 11 in the telephoto direction B is executed in Step S006.

If the lens control signal generating unit 41 determines that the stopping position of the zoom ring 11 is not the telephoto end T, the lens control signal generating unit 41 supplies a telephoto end restriction canceling signal to the telephoto end operation signal forming unit 51 through the operation controlling unit 42. The telephoto end operation signal forming unit 51 stops the excitation of the plunger solenoid 31 of the actuator 35 of the telephoto direction rotation restricting means 22, causing the ratchet pawl arm 28 of the ratchet mechanism 30 to disengage the ratchet pawl 24 at the zoom ring 11. As a result, the restriction of the rotation of the zoom ring 11 in the telephoto direction B is canceled in Step S007.

By executing the above-described steps, the sequence of steps is completed. By periodically carrying out this sequence, the rotation restriction operation and the rotation restriction canceling operation for the zoom ring 11 at the wide-angle end W and the telephoto end T can be alternately carried out.

When it is necessary to correct the zoom position by focusing or to slightly adjust the position of the zooming lens 5 due to, for example, thermal expansion/contraction of the entire lens barrel 3, the operability of the rear-focus zoom lens device 1 having an auto-focusing function is simplified if the shooter can the corrections without being conscious of it.

As described above, in the zoom lens device 1 of the present invention, the rotations of the zoom ring 11, which is a zooming member, at the wide-angle end W and the telephoto end T are restricted only by the wide-angle direction rotation restricting means 21 and the telephoto direction rotation restricting means 22, so that the zooming lens 5 and the focusing lens 6 are not fixed in any way at the wide-angle end W and the telephoto end T. Therefore, the rotation restriction operations on the zoom ring 11 at the wide-angle end W and the telephoto end T do not have any effect on the correcting operation of the angle of view.

The wide-angle direction rotation restricting means 21 and the telephoto direction rotation restricting means 22 do not completely stop the rotation of the zoom ring 11 at the wide-angle end W and the telephoto end T, respectively. As shown by the alternate long and short dash line in FIG. 4B, the wide-angle direction rotation restricting means 21 freely adjusts the rotation of the zoom ring 11 whose rotation in the wide-angle direction A is restricted in the telephoto direction B from the wide-angle end W. Similarly, as shown by the alternate long and short dash line in FIG. 5B, the telephoto direction rotation restricting means 22 freely adjusts the rotation of the zoom ring 11 whose rotation in the telephoto direction B is restricted in the wide-angle direction A. Accordingly, the angle of view can be smoothly corrected.

According to the optical controlling system 40 shown in FIG. 6, when the original wide-angle end W or telephoto end T is no longer the operation end in the wide-angle direction A or the operation end in the telephoto direction B as a result of the shooter rotating the zoom ring 11 in the telephoto direction B from the wide-angle end W or in the wide-angle direction A from the telephoto end T after restricting the rotation of the zoom ring 11 at the wide-angle end W or the telephoto end T, the rotation detecting unit 43 supplies the detection output signal DRF to the lens control signal generating unit 41 through the operation controlling unit 42, causing an operation end identifying signal to be canceled.

Then, along with this, the lens control signal generating unit 41 supplies a signal for restricting the restricting operation to either the wide-angle end operation signal forming unit 50 or the telephoto end operation signal forming unit 51 through the operation controlling unit 41, as a result of which the excitation of the plunger solenoid 31 or the actuator 34 of the wide-angle direction rotation restricting means 21 or the plunger solenoid 31 or the actuator 35 of the telephoto direction rotation restricting means 22 is canceled. By this, as shown in FIG. 4A or FIG. 5A, the ratchet pawl arm 27 of the ratchet mechanism 29 or the ratchet pawl arm 28 of the ratchet mechanism 30 disengages the ratchet pawl 23 or the ratchet pawl 24 of the zoom ring 11.

From the above, the zoom lens device 1 of the present invention has the same operability as a front-focus zoom lens device used in a related video camera. The wide-angle direction rotation restricting means 21 and the telephoto direction rotation restricting means 22 for the zoom ring 11 are disposed independently of the zooming lens 5, the focusing lens 12, and other components. Therefore, in addition to not affecting, for example, the zooming lens 5 using a electronic cam which is typical of the zoom lens device 1 of the rear focus type, the load on the motor for driving, for example, the zooming lens 5 is reduced, and size reduction of the zoom lens device 1, electric power saving, low noise, etc., can be achieved.

The optical controlling system 40 shown in FIG. 6 comprises a zoom lock switch 52. The zoom lock switch 52 is used when the shooter deliberately fixes the zoom position.

That is, when only focusing is carried out on a shooting object, such as a clay doll, on a screen while the shooter deliberately fixes the angle of view (zoom position) in, for example, animation shooting or time lapse shooting using, for example, a clay doll, the shooter turns on the zoom lock switch 52 after setting the zoom position.

This causes a zoom lock signal to be supplied to the lens control signal generating unit 41 through the operation controlling unit 42, and, then, a zoom lock command signal to be supplied to the wide-angle end operation signal forming unit 50 and the telephoto end operation signal forming unit 51 from the lens control signal generating unit 41 through the operation controlling unit 42. Then, the wide-angle end operation signal forming unit 50 and the telephoto end operation signal forming unit 51 excite the plunger solenoids 31 of the actuators 34 and 35 of the respective wide-angle direction rotation restricting means 21 and telephoto direction rotation restricting means 22, causing the ratchet pawl arms 27 and 28 of the respective ratchet mechanisms 29 and 30 to engage the ratchet pawls 23 and 24 at the zoom ring 11 as shown in FIGS. 4B and 5B. As a result, the zoom position where the zoom ring 11 is set is fixed, so that the angle of view of the zoom lens device 1 can be completely fixed.

Therefore, even if the shooter accidentally touches the zoom ring 11 after the zoom locking, the angle of view does not change. Even in this case, since the correction of the angle of view and focusing by the focus ring 12 and the movement of the zoom position when thermal expansion/contraction of the entire lens barrel 3 occurs can be carried out by the focusing lens 6 and the zooming lens 5 which are independent of the zoom ring 11. Consequently, they can be carried out internally at the lenses.

(2) Second Embodiment

Figure 9:
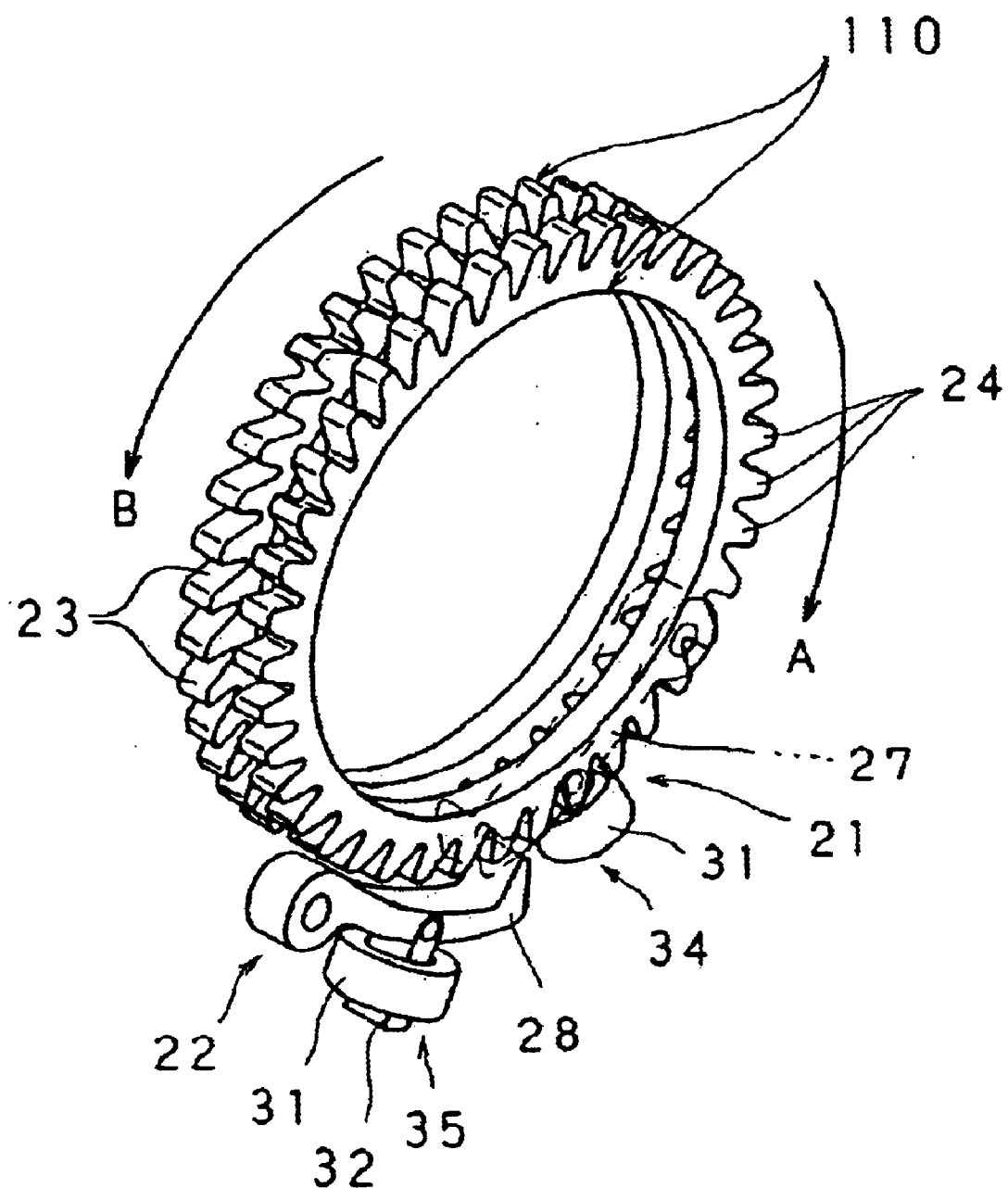
FIG. 9 is a perspective view of wide-angle direction rotation restricting means and telephoto direction rotation restricting means for a rotary ring of a rear-focus zoom lens device of a second embodiment to which the present invention is applied.

Next, a zoom lens device 1 of a second embodiment of the present invention will be given with reference to FIGS. 9 to 11. In this case, the aforementioned wide-angle direction rotation restricting means 21 and the telephoto direction rotation restricting means 22 are attached to the rotary ring 110 which rotates in response to the movement of the aforementioned zoom ring 11.

The wide-angle direction rotation restricting means 21 comprises a ratchet mechanism 29 and an actuator 34. The telephoto direction rotation restricting means 22 comprises a ratchet mechanism 30 and an actuator 35. The ratchet mechanism 29 comprises a ratchet pawl 23 and a ratchet pawl arm 27. The ratchet mechanism 30 comprises a ratchet pawl 24 and a ratchet pawl arm 28. The ratchet pawls 23 and 24 are disposed in an annular form along the entire outer periphery at respective ends of the rotary ring 110 in an axial direction. The ratchet pawl arms 27 and 28 are disposed at the outer peripheral positions of the rotary ring 110 by being pivotally supported by respective support pins 25 and 26 at the lens barrel 3, and engage and disengage the respective ratchet pawls 23 and 24 in the direction of arrows a and in the direction of arrows b, respectively, from the outside. The actuators 34 and 35 are mounted to the lens barrel 3, and comprise respective plunger solenoids 31, respective plungers 32, and respective return springs 33 for swingably driving the respective ratchet pawl arms 27 and 28 in the directions of arrows c and d.

The ratchet pawls 23 and 24 and the ratchet pawl arms 27 and 28 of the respective wide-angle direction rotation restricting means 21 and telephoto direction rotation restricting means 22 are inclined in opposite directions.

Accordingly, the wide-angle direction rotation restricting means 21 is formed as unidirectional rotation restricting means for allowing rotation of the rotary ring 110 in the telephoto direction B while restricting the rotation of the rotary ring 110 in the wide-angle direction A. Similarly, the telephoto direction rotation restricting means 22 is formed as unidirectional rotation restricting means for allowing rotation of the rotary ring 110 in the wide-angle direction A while restricting the rotation of the rotary ring 110 in the telephoto direction B.

Figure 10:
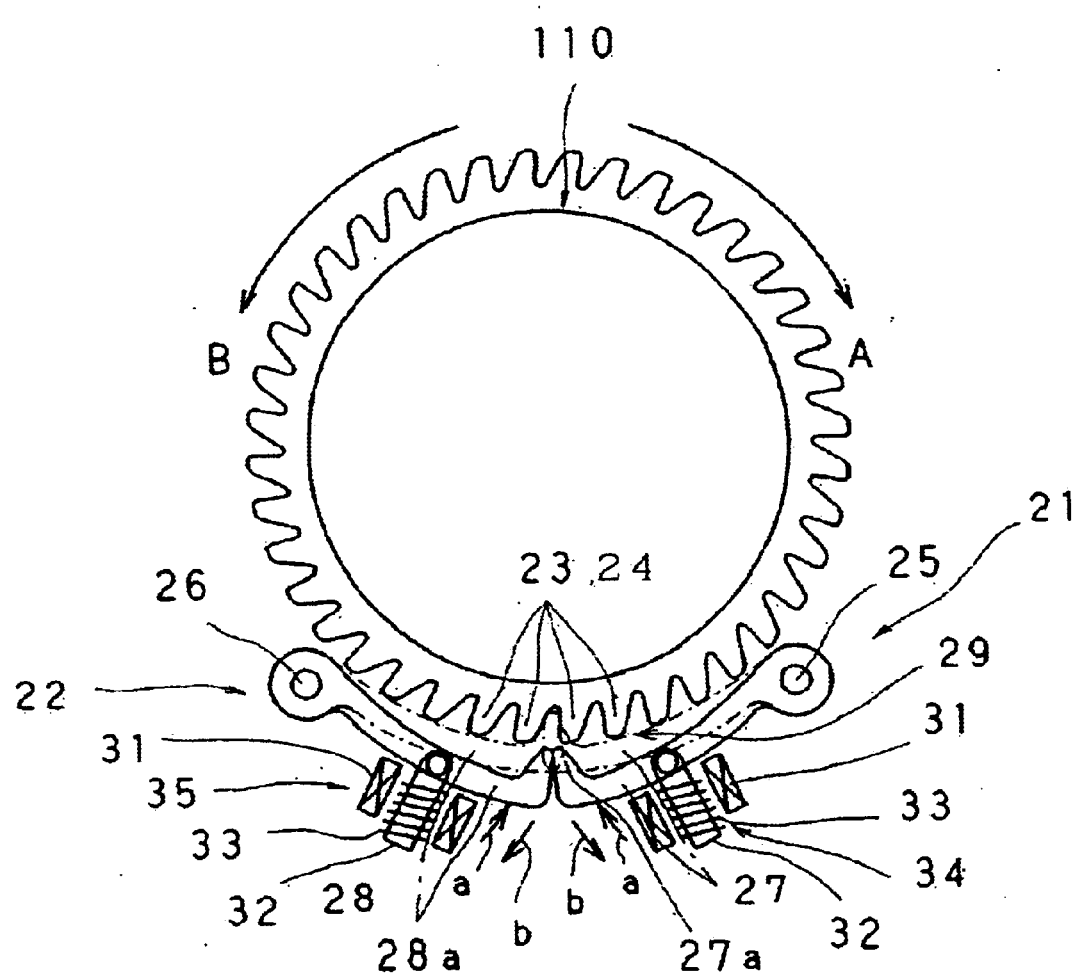
FIG. 10 is a side view of FIG. 9.
Figure 11:
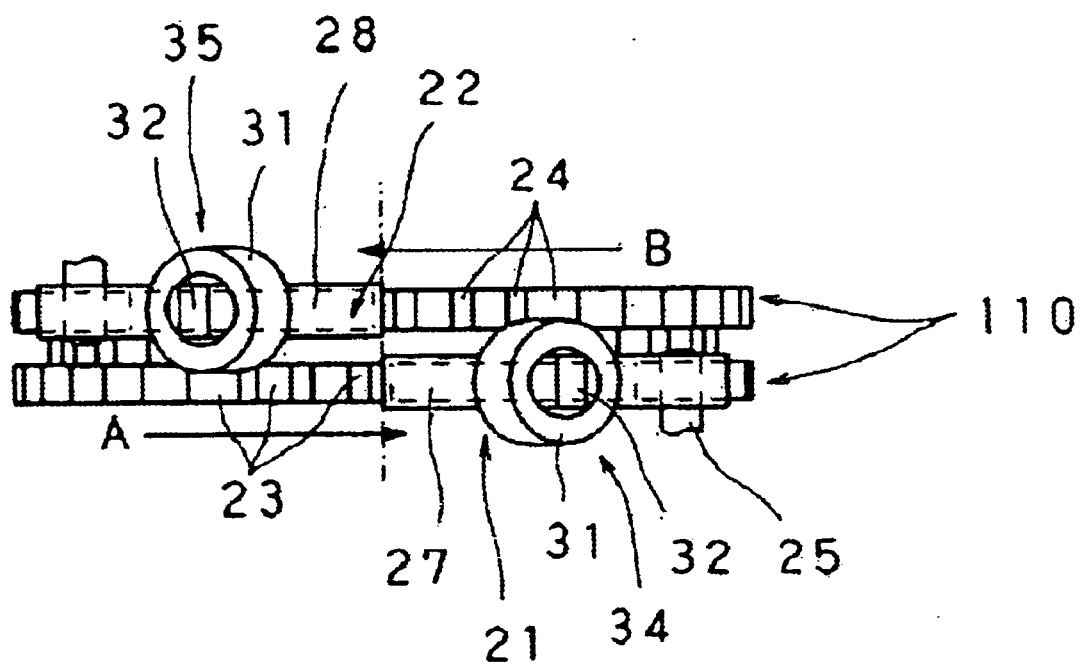
FIG. 11 is a bottom view of FIG. 10.
Figure 12:
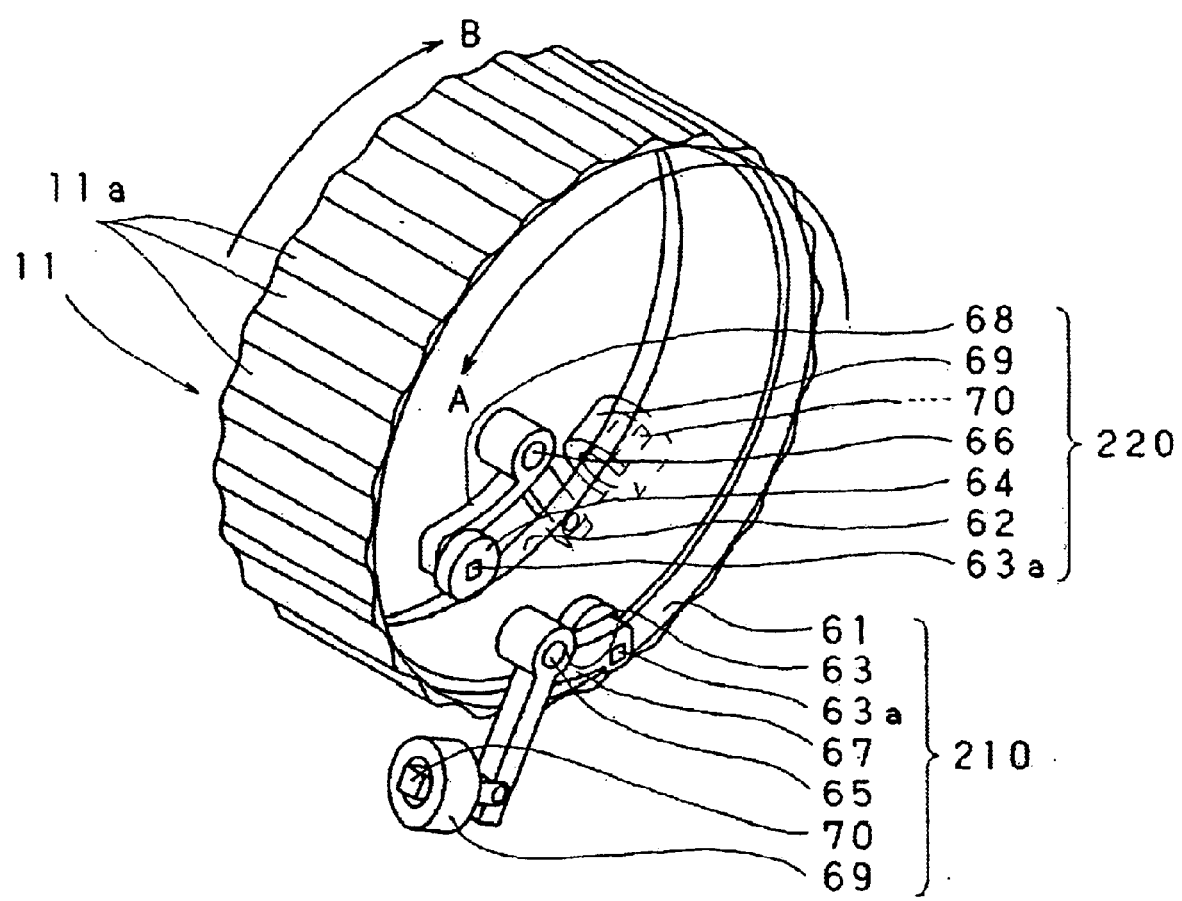
FIG. 12 is a perspective view of wide-angle direction stepless rotation restricting means and telephoto direction stepless rotation restricting means of a rear-focus zoom lens device of a third embodiment to which the present invention is applied.
Figure 13:
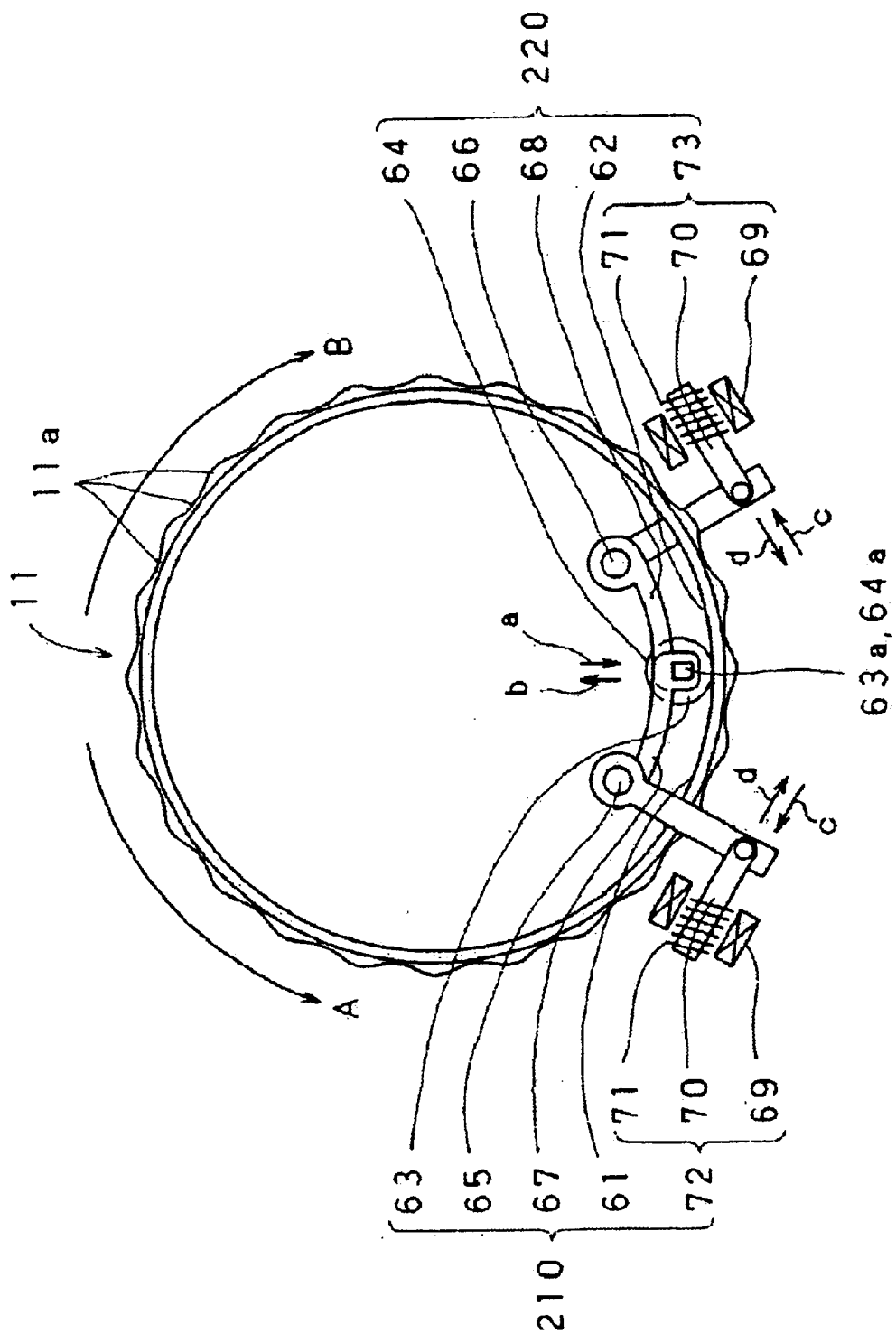
FIG. 13 is a side view of FIG. 12.
Figure 14:
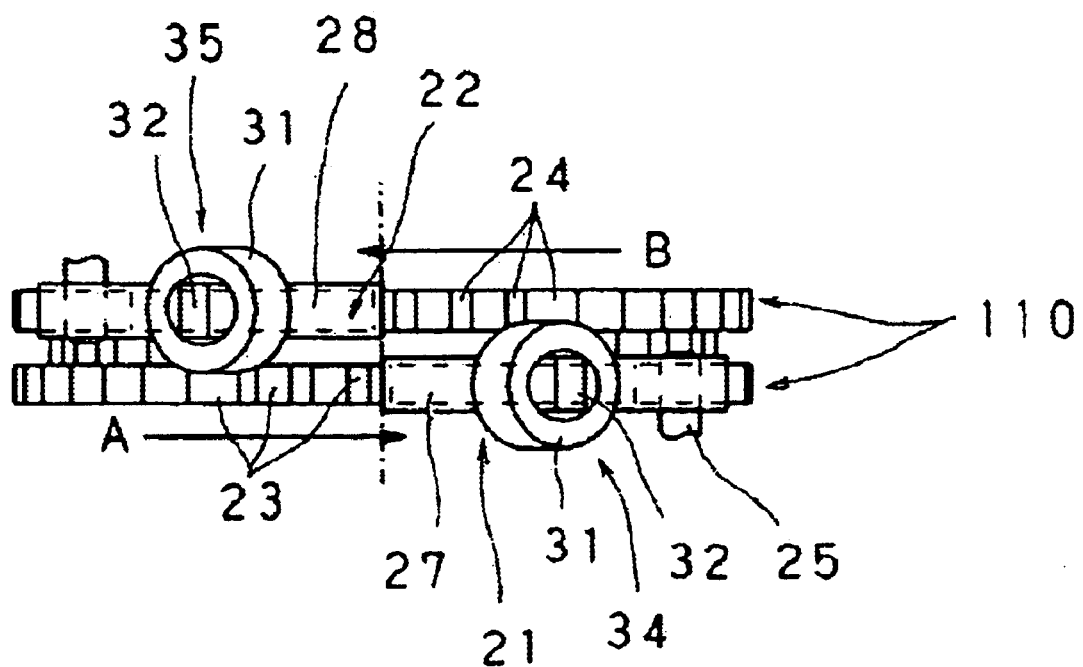
FIG. 14 is a bottom view of FIG. 13.

As in the first embodiment, when the plunger solenoids 31 of the actuators 34 and 35 are in an unexcited state, as shown by solid lines in FIG. 10, the ratchet pawl arms 27 and 28 are disengaged from the respective ratchet pawls 23 and 24 in the directions of arrows b. When the plunger solenoids 31 of the actuators 34 and 35 are excited, as shown by alternate long and short dash lines in FIG. 10, the plungers 32 are attracted in the directions of arrows c against the return springs 33, so that the ratchet arms 27 and 28 engage the respective ratchet pawls 23 and 24 in the directions of arrows a.

Therefore, in the second embodiment, as in the first embodiment, the restriction of the rotation at a wide-angle end W when the zoom ring 11 is rotated in the wide-angle direction A, the restriction of the rotation at a telephoto end T when the zoom ring 11 is rotated in the telephoto direction B, zoom locking, etc. can be carried out.

(3) Third Embodiment

Next, a description of a zoom lens device 1 of a third embodiment of the present invention will be given with reference to FIGS. 12 to 17. In this case, a wide-angle direction stepless rotation restricting means 210 and a telephoto direction stepless rotation restricting means 220 for restricting the rotation at stepless positions on the circumference of a zoom ring 11 are formed as the wide-angle direction rotation restricting means 21 and the telephoto direction rotation restricting means 22 for the zoom ring 11.

The wide-angle direction stepless rotation restricting means 210 and the telephoto direction stepless rotation restricting means 220 comprise, for example, respective roller compression surfaces 61 and 62, respective unidirectional rotation compression rollers 63 and 64, respective compression arms 67 and 68, and respective actuators 72 and 73. The roller compression surfaces 61 and 62 are smooth surfaces formed at the inner peripheral surface at respective ends of the zoom ring 11 in the axial direction thereof. The unidirectional rotation compression rollers 63 and 64, each of which is rotatable only in one direction, rotate in opposite directions by respective one way rotary clutches 63d and 64d (described later). The compression arms 67 and 68 are disposed at the respective ends of the zoom ring 11 by being pivotally supported by respective support pins 65 and 66 at the lens barrel 3, and cause the respective compression rollers 63 and 64, mounted to ends of the compression arms 67 and 68, to compress and to separate from the roller compression surfaces 61 and 62 in the directions of arrows a and b, respectively. The actuators 72 and 73 are mounted to the lens barrel 3 and comprise respective plunger solenoids 69, respective plungers 70, and respective return springs 71 for swingably driving the compression arms 67 and 68 in the directions of arrows c and d.

The unidirectional rotation compression rollers 63 and 64 comprise respective stationary wheels 63b and 64b secured to the ends of the respective compression arms 67 and 68 through respective stationary shafts 63a and 64a (such as angular shafts), respective unidirectional rotary wheels 63c and 64c rotatably mounted to the outer peripheries of the respective stationary wheels 63b and 64b, and respective at least one one-way rotary clutch 63d and at least one one-way rotary clutch 64d. The at least one one-way rotary clutch 63d is disposed between the stationary wheel 63b and the unidirectional rotary wheel 63c, and comprises, for example, a wedge groove 63e and a ball (or roller) 63f. The at least one one-way rotary clutch 64d is disposed between the stationary wheel 64b and the unidirectional rotary wheel 64c, and comprises, for example, a wedge groove 64e and a ball (roller) 64f. The grooves 63e and 64e are disposed with arc shapes between the inner peripheries of the respective stationary wheels 63b and 64b and the outer peripheries of the respective rotary wheels 63c and 64c, and are oriented in opposite directions. The balls 63f and 64f are movable in the respective grooves 63e and 64e in the directions of arrows e and f and/or in the directions of arrows g and h, which are circumferential directions of the unidirectional rotary wheels 63c and 64c.

Here, it is desirable that the roller compression surfaces 61 and 62 of the zoom ring 11 and/or the outer peripheral surfaces of the unidirectional rotary wheels 63c and 64c be formed of a material having high friction, such as rubber.

Figure 16A:
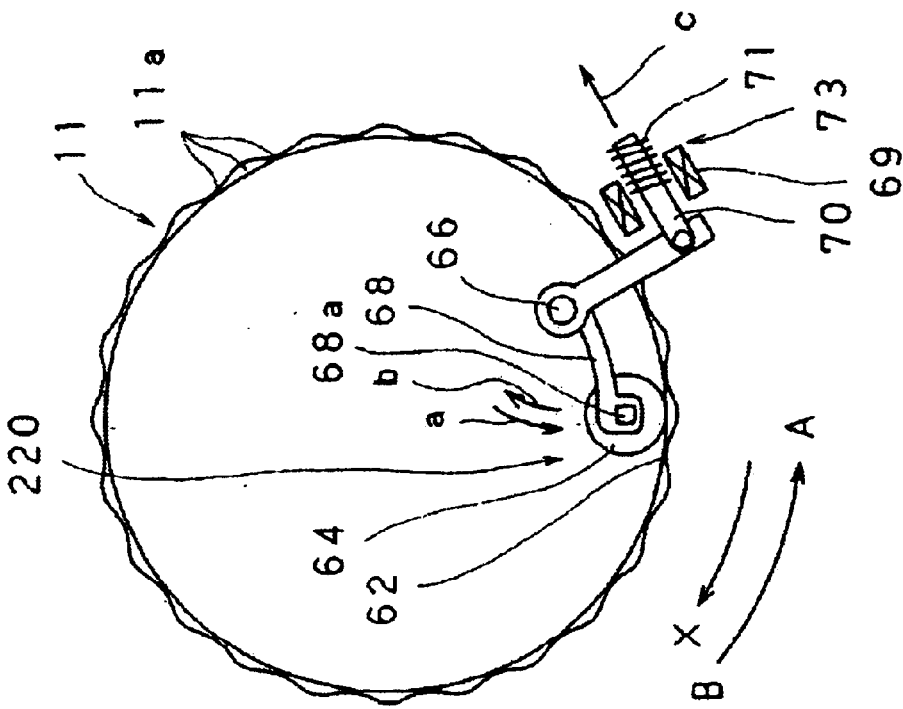
FIGS. 16A and 16B are side views for illustrating the operations of the telephoto direction stepless rotation restricting means.

According to the wide-angle direction stepless rotation restricting means 210 and the telephoto direction stepless rotation restricting means 220, as shown in FIGS. 15A and 16A, when the plunger solenoids 69 of the respective actuators 72 and 73 are in an unexcited state (off), the unidirectional rotary compression rollers 63 and 64 are separated from the respective roller compression surfaces 61 and 62 of the zoom ring 11 by the respective return springs 71 through the respective compression arms 67 and 68 in the directions of arrows b. Therefore, the zoom ring 11 can rotate freely in a wide-angle direction A and a telephoto direction B.

Figure 16B:
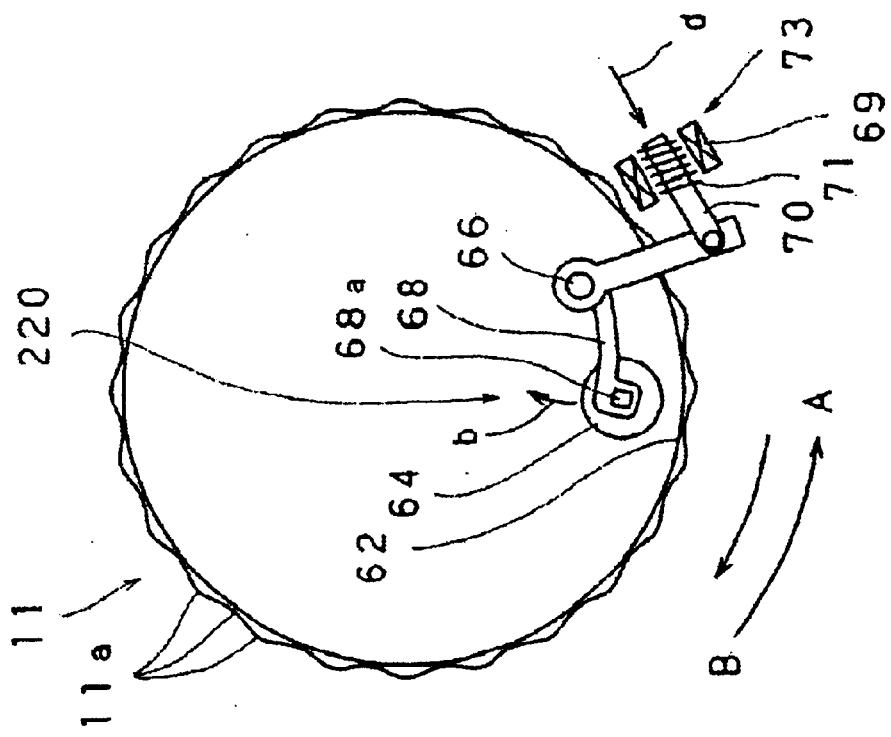

In contrast, as shown in FIGS. 15B and 16B, when the plunger solenoids 69 of the respective actuators 72 and 73 are excited (on) at a wide-angle end W and a telephoto end T while the rotations of the zoom ring 11 in the wide-angle direction A and the telephoto direction B are being adjusted, respectively, the plungers 70 are attracted in the directions of arrows c against the respective return springs 71, causing the compression arms 67 and 68 to rotate around the support pins 65 and 66 as centers by the force of the return springs 71. This causes the unidirectional rotation compression rollers 63 and 64 to compress the respective roller compression surfaces 61 and 62 in the directions of arrows a due to the forces of the respective return springs 71 by the respective one-way rotary wheels 63c and 64c at the outer peripheries of the respective unidirectional rotation compression rollers 63 and 64. The compressions cause the zoom ring 11 to be instantaneously stopped at respective compression points (corresponding to stepless positions in the circumferential direction of the zoom ring 11).

In other words, as shown by solid lines in FIGS. 17A and 17B, the unidirectional rotary wheels 63c and 64c of the unidirectional rotary compression rollers 63 and 64 compress the respective roller compression surfaces 61 and 62 in the directions of arrows a. At the moment that they are rotated in the direction of arrows e and the direction of arrows g, respectively, which are the same as respective directions of rotations of the zoom ring 1, the balls 63f and 64f of the respective one-way clutches 63d and 64d move into the narrower portions of the respective grooves 63e and 64e in the respective directions of arrows e and g, so that the respective one-way rotation clutches 63d and 64d are turned on. At the moment that they are turned on, the unidirectional rotary wheels 63c and 64c stop rotating, so that the rotations of the zoom ring 11 in the respective wide-angle direction A and telephoto direction B are stopped instantly.

In contrast, as shown by alternate long and short dash lines in FIGS. 17A and 17B, when the rotations of the zoom ring 11 are adjusted in respective directions opposite to the wide-angle direction A and the telephoto direction B after the rotations of the zoom ring 11 at the wide-angle end W in the wide-angle direction A and the telephoto end T in the telephoto direction B are restricted, respectively, the balls 63f and 64f of the respective one-way rotary clutches 63d and 64d move towards the wider portions of the respective grooves 63e and 64e in the respective directions of arrows f and h, so that the respective one-way rotary clutches 63d and 64d are turned off. Therefore, at this time, the restriction of the rotation of the zoom ring 11 by the one-way rotary clutches 63d and 64d are not carried in any way, so that the rotation of the zoom ring 11 can be freely adjusted in the respective directions opposite to the wide-angle direction A and the telephoto direction B.

The use of the wide-angle direction stepless rotation restricting means 210 and the telephoto direction stepless rotation restricting means 220 as the wide-angle direction rotation restricting means and the telephoto direction rotation restricting means makes it possible to more minutely restrict the rotations (that is, perform positioning) at the wide-angle end W and the telephoto end T of the zoom ring 11 (that is, to restrict the rotation within 360 degrees in a stepless manner). Therefore, the wide-angle end W and the telephoto end T can be set with high precision.

The wide-angle direction stepless rotation restricting means 210 and the telephoto direction stepless rotation restricting means 220 may be formed so that the unidirectional rotation compression rollers 63 and 64 compress and separate from the respective sides of the roller compression surfaces 61 and 62, disposed at the respective sides of the zoom ring 11 in the axial direction, from the left and right. As in the above-described second embodiment, the wide-angle direction stepless rotation restricting means 210 and the telephoto direction stepless rotation restricting means 220 may be attached to the rotary ring 110 which rotates in response to the movement of the zoom ring 11 as described above.

Although the present invention is described with reference to the first to third embodiments, the present invention is not limited thereto. Therefore, various effective modifications may be made based on the technical ideas of the present invention.

For example, although, in the embodiments, ratchet mechanisms are used as the wide-angle direction rotation restricting means and the telephoto direction rotation restricting means, and plunger solenoids are used as the actuators, the present invention is not limited thereto. In addition, although, in the third embodiment, the unidirectional rotary compression rollers incorporating the one-way rotary clutches in the wide-angle direction stepless rotation restricting means and the telephoto direction stepless rotation restricting means compress and separate from the roller compression surfaces by the actuators using plunger solenoids, the present invention is not limited thereto.

What is claimed is:

1. A rear-focus zoom lens device comprising:
two rotation restricting means for separately restricting rotations of a zoom ring in first and second rotation directions with respect to a lens barrel and for separately canceling the restricting operations, the second rotation direction being opposite to the first rotation direction.

2. The rear-focus zoom lens device according to claim 1, wherein the two rotation restricting means are unidirectional rotation restricting means for allowing rotations of the zoom ring in the directions opposite to the respective first and second rotation directions at any rotation restriction positions in the first and second rotation directions of the zoom ring.

3. The rear-focus zoom lens device according to claim 1, wherein the two rotation restricting means are stepless rotation restricting means for restricting the rotations of the zoom ring in the first and second rotation directions and for canceling the restricting operations at any stepless rotation restriction positions in the first and second rotation directions of the zoom ring.

4. The rear-focus zoom lens device according to claim 1, wherein the rotations of the zoom ring in the first rotation direction and the second rotation direction are, respectively, restricted at any wide-angle end position and at any telephoto end position in the first rotation direction and second rotation direction of the zoom ring.

5. The rear-focus zoom lens device according to claim 1, wherein the two rotation restricting means are controlled by a control signal generated from a lens control signal generating unit on the basis of a position detecting signal from a zoom ring position detecting unit in order to restrict the rotations of the zoom ring and cancel the restricting operations at any rotation restriction positions in the first and second rotation directions of the zoom ring.

6. The rear-focus zoom lens device according to claim 1, wherein the two rotation restricting means are locking means for locking the rotations of the zoom ring with respect to the lens barrel in the first and second rotation directions at any rotation restriction positions in the first and second rotation directions of the zoom ring.

7. The rear-focus zoom lens device according to claim 1, wherein the two rotation restricting means restrict the rotations of the zoom ring at both ends of a predetermined rotational range of the zoom ring in the first and second rotation directions of the zoom ring by a predetermined control signal.

8. A video camera comprising:
a rear-focus zoom lens device comprising two rotation restricting means for separately restricting rotations of a zoom ring in first and second rotation directions with respect to a lens barrel and for separately canceling the restricting operations, the second rotation direction being opposite to the first rotation direction.

9. The video camera according to claim 8, wherein the two rotation restricting means are unidirectional rotation restricting means for allowing rotations of the zoom ring in the directions opposite to the respective first and second rotation directions at any rotation restriction positions of the zoom ring.

10. The video camera according to claim 8, wherein the two rotation restricting means are stepless rotation restricting means for restricting the rotations of the zoom ring in the first and second rotation directions and for canceling the restricting operations at any stepless rotation restriction positions in the first and second rotation directions of the zoom ring.

11. The video camera according to claim 8, wherein the rotations of the zoom ring in the first rotation direction and the second rotation direction are, respectively, restricted at any wide-angle end position and at any telephoto end position in the first rotation direction and second rotation direction of the zoom ring.

12. The video camera according to claim 8, wherein the two rotation restricting means are controlled by a control signal generated from a lens control signal generating unit of the video camera on the basis of a position detecting signal from a zoom ring position detecting unit in order to restrict the rotations of the zoom ring and cancel the restricting operations at any rotation restriction positions in the first and second rotation directions of the zoom ring.

13. The video camera according to claim 8, wherein the two rotation restricting means are locking means for locking the rotations of the zoom ring with respect to the lens barrel in the first and second rotation directions at any rotation restriction positions in the first and second rotation directions of the zoom ring.

14. The video camera according to claim 8, wherein the two rotation restricting means restrict the rotations of the zoom ring at both ends of a predetermined rotational range of the zoom ring in the first and second rotation directions of the zoom ring by a predetermined control signal.

* * * * *